(12) United States Patent
Kim et al.

(10) Patent No.: US 11,140,629 B2
(45) Date of Patent: Oct. 5, 2021

(54) METHOD FOR POWER MANAGEMENT IN WIRELESS LAN SYSTEM AND ACCESS POINT USING SAME

(71) Applicant: LG ELECTRONICS INC., Seoul (KR)

(72) Inventors: Suhwook Kim, Seoul (KR); Kiseon Ryu, Seoul (KR); Hyunhee Park, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 286 days.

(21) Appl. No.: 16/337,385

(22) PCT Filed: Sep. 22, 2017

(86) PCT No.: PCT/KR2017/010437
§ 371 (c)(1),
(2) Date: Mar. 27, 2019

(87) PCT Pub. No.: WO2018/062772
PCT Pub. Date: Apr. 5, 2018

(65) Prior Publication Data
US 2020/0037250 A1    Jan. 30, 2020

Related U.S. Application Data

(60) Provisional application No. 62/401,899, filed on Sep. 30, 2016, provisional application No. 62/410,857, filed on Oct. 21, 2016.

(51) Int. Cl.
*H04W 52/02* (2009.01)
*H04W 72/04* (2009.01)
(Continued)

(52) U.S. Cl.
CPC .... *H04W 52/0235* (2013.01); *H04W 52/0216* (2013.01); *H04W 72/042* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 9,485,733 | B1* | 11/2016 | Park | H04W 52/0235 |
| 2008/0170569 | A1* | 7/2008 | Garg | G06F 1/3203 |
| | | | | 370/390 |

(Continued)

FOREIGN PATENT DOCUMENTS

| KR | 1020090031692 | 3/2009 |
|---|---|---|
| KR | 1020140033222 | 3/2014 |
| KR | 1020160065179 | 6/2016 |

OTHER PUBLICATIONS

PCT International Application No. PCT/KR2017/010437, International Search Report dated Dec. 15, 2017, 4 pages.

(Continued)

*Primary Examiner* — Kodzovi Acolatse
(74) *Attorney, Agent, or Firm* — Lee, Hong, Degerman, Kang & Waimey

(57) ABSTRACT

A method for power management in a wireless LAN system, according to one embodiment of the present specification, comprises the steps of: transmitting a first wake-up packet for a first WUR terminal and a second WUR terminal, wherein the first wake-up packet instructs a first main radio module and a second main radio module to enter into an activation state, and the first wake-up packet includes a first payload, which is modulated according to an On-Off Keying (OOK) method for the first WUR module, and a second payload, which is modulated according to the OOK method for the second WUR module; transmitting a plurality of (Continued)

downlink packets for the first WUR terminal and the second WUR terminal when a preset guard time has elapsed; determining whether at least one acknowledgement packet is received from the first WUR terminal and the second WUR terminal in response to a plurality of downlink packets within a preset retransmission time limit; and transmitting a second wake-up packet according to the determination.

9 Claims, 17 Drawing Sheets

(51) Int. Cl.
    *H04W 84/12*     (2009.01)
    *H04W 88/08*     (2009.01)

(56) References Cited

U.S. PATENT DOCUMENTS

| | | | |
|---|---|---|---|
| 2011/0228752 | A1 | 9/2011 | Wu |
| 2014/0112226 | A1* | 4/2014 | Jafarian ............ H04W 52/0225 370/311 |
| 2015/0012761 | A1* | 1/2015 | Li ................... G06F 1/3209 713/310 |
| 2017/0094600 | A1* | 3/2017 | Min ..................... H04L 5/0007 |
| 2017/0280358 | A1* | 9/2017 | Ma ....................... H04L 1/1607 |
| 2017/0280498 | A1* | 9/2017 | Min ..................... H04L 5/0053 |
| 2018/0018185 | A1* | 1/2018 | Sun ................. H04W 52/0235 |
| 2018/0019902 | A1* | 1/2018 | Suh .................... H04L 27/2602 |
| 2018/0020404 | A1* | 1/2018 | Huang ............. H04W 52/0229 |
| 2018/0020405 | A1* | 1/2018 | Huang ............. H04W 52/0229 |
| 2018/0020501 | A1* | 1/2018 | Aboul-Magd ........ H04W 76/28 |
| 2018/0092036 | A1* | 3/2018 | Azizi ................... H04L 5/0064 |

OTHER PUBLICATIONS

Suhua, T. et al., "Wake-up receiver for radio-on-demand wireless LANs", EURASIP Journal on Wireless Communications and Networking, Feb. 2012, 16 pages.

IEEE: Section 9.3.1.23 of the standard document IEEEP802.11ax D1.3, IEEE Standards Draft, Jun. 2017, 13 pages.

IEEE: Section 27.42 of the standard document IEEE P802.11ax D1.3, IEEE Standards Draft, Jun. 2017, 3 pages.

* cited by examiner (A)

(B)

METHOD FOR POWER MANAGEMENT IN WIRELESS LAN SYSTEM AND ACCESS POINT USING SAME

CROSS-REFERENCE TO RELATED APPLICATIONS

This application is the National Stage filing under 35 U.S.C. 371 of International Application No. PCT/KR2017/0010437, filed on Sep. 22, 2017, which claims the benefit of U.S. Provisional Application No. 62/401,899, filed on Sep. 30, 2016, and 62/410,857, filed on Oct. 21, 2016, the contents of which are all hereby incorporated by reference herein in their entirety.

BACKGROUND OF THE INVENTION

Field of the Invention

This specification relates to wireless communication and, most particularly, to a method for power management in a wireless LAN system and an access point using the same.

Related Art

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

Further, in the next generation WLAN, active discussion is expected on system performance improvement in an overlapping basic service set (OBSS) environment, outdoor environmental performance improvement, cellular offloading, or the like, rather than single link performance improvement in one basic service set (BSS). Directionality of the next generation WLAN implies that the next generation WLAN gradually has a technical range similar to mobile communication. Recently, considering that mobile communication and WLAN technologies are discussed together in a small cell and a direct-to-direct (D2D) communication region, technology and business convergence of the next generation WLAN and the mobile communication is expected to be more active.

SUMMARY OF THE INVENTION

Technical Objects

An object of this specification is to provide a method for power management using enhanced power efficiency in a wireless LAN system and an access point using the same.

Technical Solutions

According to an exemplary embodiment of this specification, a method for power management in a wireless LAN system being performed by an access point (AP) includes the steps of: transmitting a first wake-up packet for a first wake-up receiver (WUR) device including a first main radio module and a first WUR module and a second WUR device including a second main radio module and a second WUR module, wherein the first wake-up packet informs the first main radio module and the second main radio module to enter an active state, wherein the first wake-up packet includes a first payload being modulated according to an On-Off Keying (OOK) scheme for the first WUR module and a second payload being modulated according to an OOK scheme for the second WUR module, if a predetermined guard time is elapsed, transmitting a plurality of downlink packets for the first WUR device and the second WUR device, determining whether or not at least one acknowledgement packet is received from the first WUR device and the second WUR device as a response to the plurality of downlink packets within a predetermined retransmission limit time, and, based on the determined result, transmitting a second wake-up packet.

Effects of the Invention

According to an exemplary embodiment of this specification, provided herein is a method for power management using enhanced power efficiency in a wireless LAN system and an access point using the same.

DESCRIPTION OF EXEMPLARY EMBODIMENTS

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
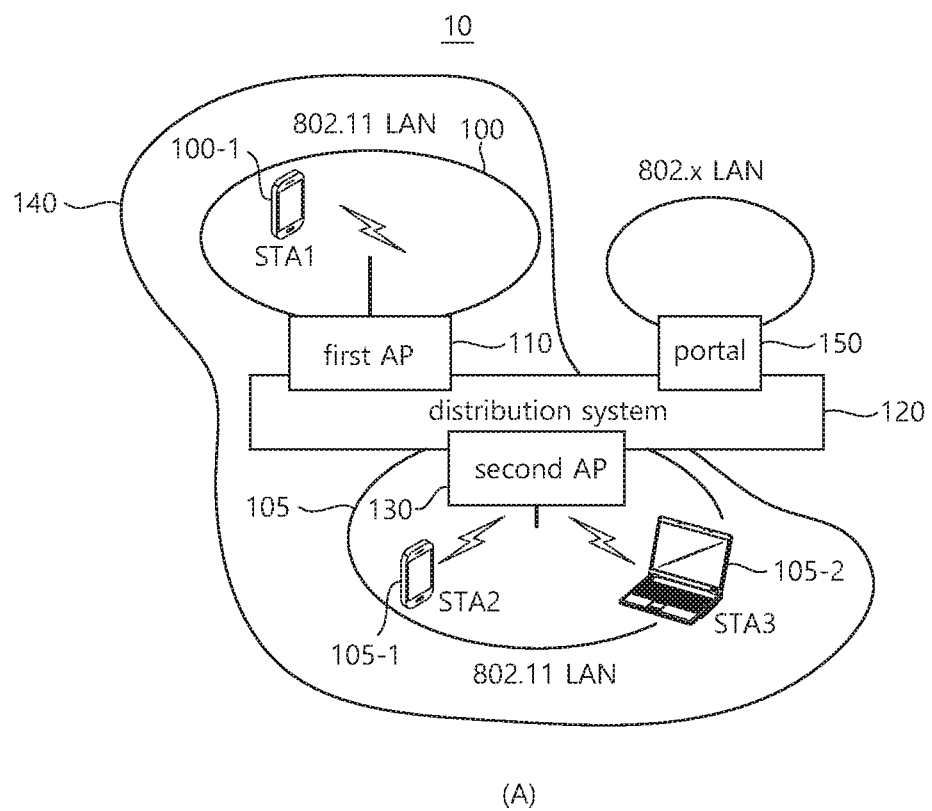
FIG. 1 is a conceptual view illustrating the structure of a wireless local area network (WLAN) system.
Figure 1:
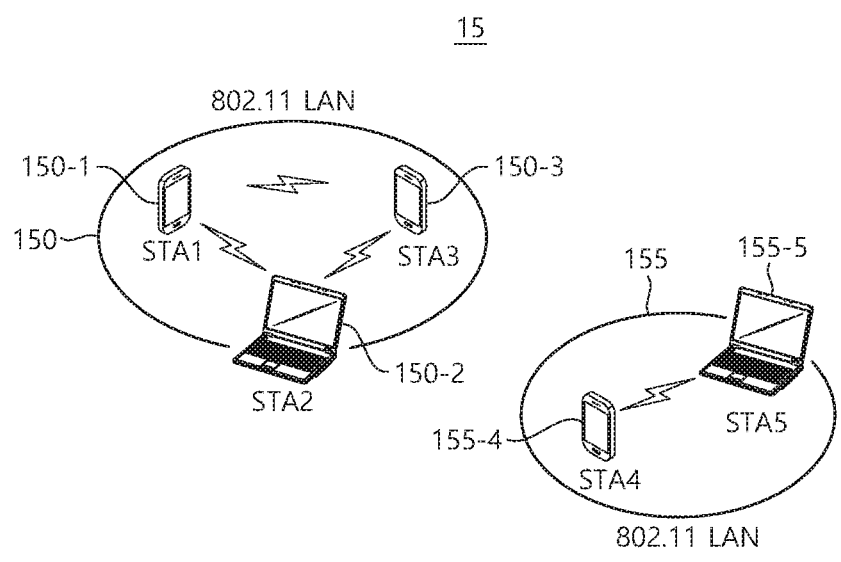

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring to (A) of FIG. 1, the wireless LAN system (10) of the FIG. 1(A) may include one or more infrastructure BSSs (100, 105) (hereinafter, referred to as BSS). The BSSs (100, 105) as a set of an AP and an STA such as an access point (AP) (125) and a station (STA1) (100-1) which are successfully synchronized to communicate with each other are not concepts indicating a specific region.

For example, the BSS (100) may include one AP (110) and one or more STAs (100-1) which may be associated with one AP (110). The BSS (105) may include one or more STAs (105-1, 105-2) which may be associated with one AP (130).

The infrastructure BSS (100, 105) may include at least one STA, APs (125, 130) providing a distribution service, and a distribution system (DS) (120) connecting multiple APs.

The distribution system (120) may implement an extended service set (ESS) (140) extended by connecting the multiple BSSs (100, 105). The ESS (140) may be used as a term indicating one network configured by connecting one or more APs (110, 130) through the distribution system (120). The AP included in one ESS (140) may have the same service set identification (SSID).

A portal (150) may serve as a bridge which connects the wireless LAN network (IEEE 802.11) and another network (e.g., 802.X).

In the BSS illustrated in the FIG. 1(A), a network between the APs (110, 130) and a network between the APs (110, 130) and the STAs (100-1, 105-1, 105-2) may be implemented.

FIG. 1(B) illustrates a conceptual view illustrating the IBSS.

Referring to FIG. 1(B), a WLAN system (15) of FIG. 1(B) may be capable of performing communication by configuring a network between STAs in the absence of the APs (110, 130) unlike in FIG. 1(A). When communication is performed by configuring the network also between the STAs in the absence of the AP (110, 130), the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS (15), STAs (150-1, 150-2, 150-3, 155-4, 155-5) are managed by a distributed manner. In the IBSS, all STAs (150-1, 150-2, 150-3, 155-4, 155-5) may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
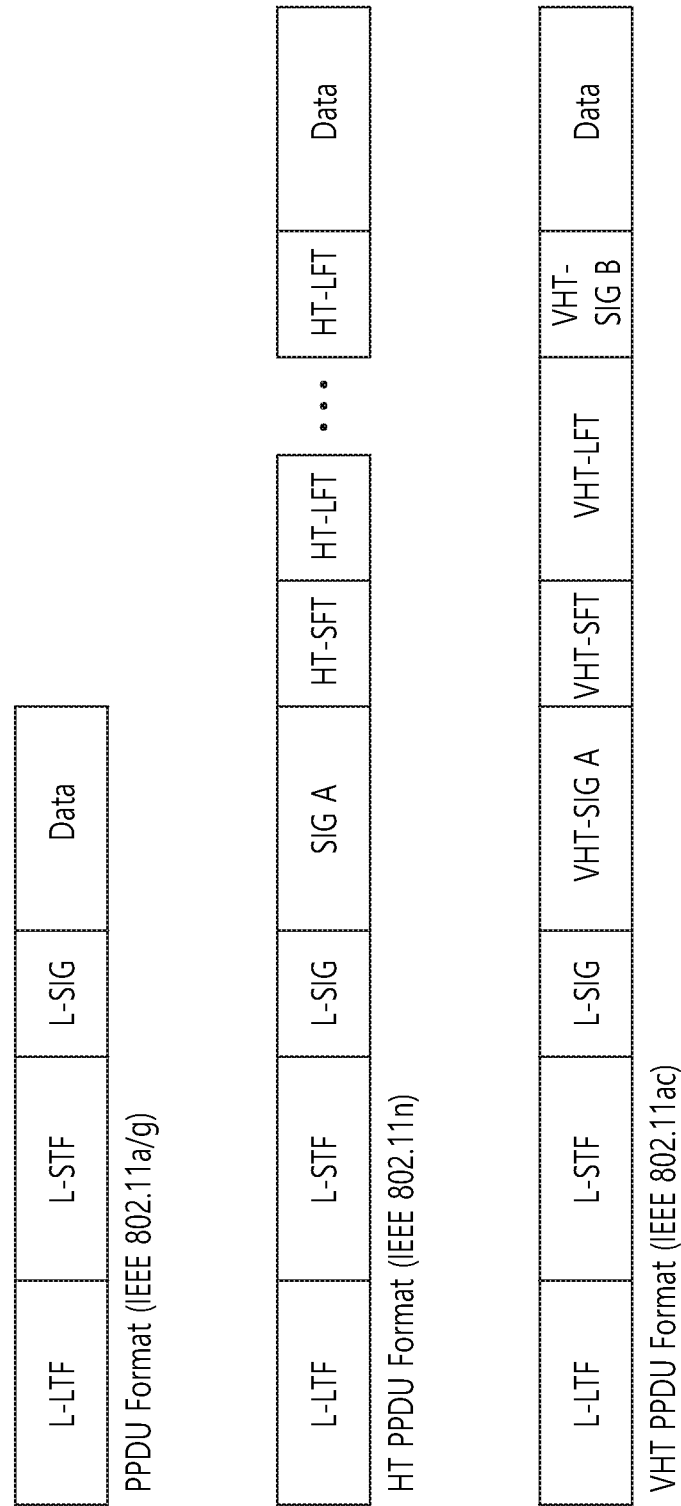
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
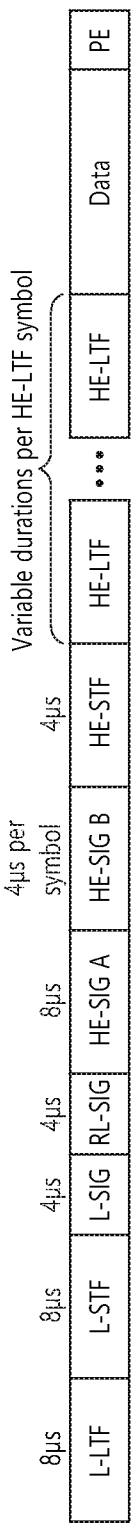
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

A PPDU that is used in the IEEE standard is described as a PPDU structure being transmitting mainly within a channel bandwidth of 20 MHz. A PPDU structure that is transmitted within a bandwidth (e.g., 40 MHz, 80 MHz) that is wider than the channel bandwidth of 20 MHz may correspond to a structure applying linear scaling of the PPDU structure being used in the channel bandwidth of 20 MHz.

The PPDU that is used in the IEEE standard is generated based on a 64. Fast Fourier Transform (FFT), and a cyclic prefix (CP) portion may correspond to ¼. In this case, the length of a valid (or effective) symbol section (or FFT section) may be equal to 3.2 us, a CP length may be equal to 0.8 us, and a symbol duration may be equal to 4 us (=3.2 us+0.8 us), which corresponds to a sum of the length of the valid symbol section and the CP length.

Figure 4:
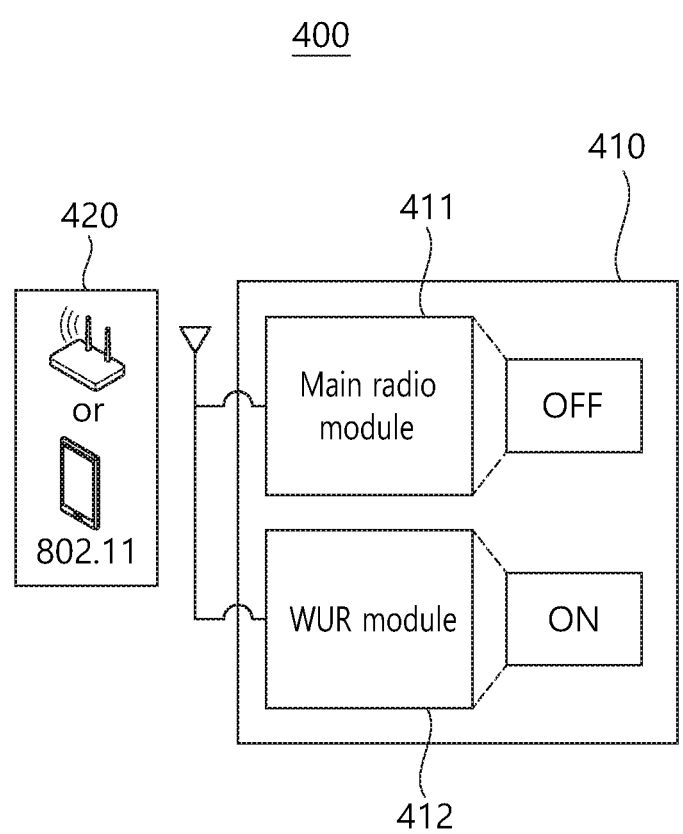
FIG. 4 is an internal block diagram of a wireless device receiving a wake-up packet.

FIG. 4 is an internal block diagram of a wireless device receiving a wake-up packet.

Referring to FIG. 4, a wireless LAN system (400) according to an exemplary embodiment of this specification may include a first wireless device (410) and a second wireless device (420).

The first wireless device (410) may include a main radio module (411) being related to a main radio (i.e., 802.11) and a module including a Low-Power Wake-Up receiver (LP WUR) (hereinafter referred to as a WUR module (412)). The main radio module (411) may transmit user data or receive user data while operating in an active state (i.e., ON state).

In case data (or packet) that is to be transmitted by the main radio module (411) does not exist, the first radio device (410) may perform control operations so that the main radio module (411) can enter a non-active state (i.e., OFF state). For example, the main radio module (411) may include multiple circuits supporting Wi-Fi, Bluetooth radio (hereinafter referred to as a BT radio), and a Bluetooth Low Energy radio (hereinafter referred to as a BLE radio).

According to the related art, a wireless device operating based on a Power Save mode may be operated in an active state or a sleep state.

For example, a wireless device operating in the active state may receive all frames being transmitted from another wireless device. Additionally, a wireless device operating in the sleep mode may receive a specific type of frame (e.g., a beacon frame being periodically transmitted) being transmitted by another wireless device (e.g., AP).

It will be assumed that the wireless device that is mentioned in this specification is capable of operating the main radio module in an active state or a non-active state.

A wireless device that includes a main radio module (411) being in a non-active state (i.e., OFF state) is incapable of receiving a frame (e.g., an 802.11 type PPDU), which is transmitted from another wireless device (e.g., AP), until the main radio module is woken up by the WUR module (412).

For example, the wireless device that includes a main radio module (411) being in the non-active state (i.e., OFF state) is also incapable of receiving a beacon frame that is periodically transmitted by the AP.

More specifically, it may be understood that the wireless device including the main radio module (e.g., 411), which is in the non-active state (i.e., OFF state), is being operated in a deep sleep mode.

Additionally, the wireless device including the main radio module (411), which is in the active state (i.e., ON state), is capable of receiving a frame (e.g., an 802.11 type PPDU), which is transmitted from another wireless device (e.g., AP).

Additionally, it will be assumed that the wireless device that is mentioned in this specification is capable of operating the WUR module in a turn-OFF state or a turn-ON state.

The wireless device including a WUR module (412) being in the turn-ON state is capable of receiving only a specific type of frame, which is transmitted from another wireless device. In this case, the specific type of frame may be understood as a frame being modulated by using an On-Off Keying (OOK) modulation scheme, which will be described in more detail later with reference to FIG. 5.

The wireless device that includes a WUR module (412) being in the turn-OFF state is incapable of receiving a specific type of frame that is transmitted by another wireless device.

In this specification, in order to indicate an ON state of a specific module being included in the wireless device, the terms active state and turn-ON state may be interchangeably used. Similarly, in order to indicate an OFF state of a specific module being included in the wireless device, the terms non-active state and turn-OFF state may be interchangeably used.

The wireless device according to an exemplary embodiment of this specification may receive a frame (or packet) from another wireless device based on the main radio module (411) or the WUR module (412), which is in an active state.

The WUR module (412) may correspond to a receiver for waking-up the main radio module (411). More specifically, the WUR module (412) may not include a transmitter. The WUR module (412) may maintain its turn-ON state during a duration while the main radio module (411) is in the non-active state.

For example, when a Wake-Up Packet (hereinafter referred to as WUP) for the main radio module (411) is received, the first wireless device (410) may perform control operations so that the main radio module (411), which is in the non-active state, can enter the active state.

A low-power wake-up receiver (LP WUR), which is included in the WUR module (412), aims to achieve a target power consumption of less than 1 mW while operating in the active state. Additionally, the low-power wake-up receiver may use a narrow bandwidth of less than 5 MHz.

Additionally, the power that is consumed by the low-power wake-up receiver may be less than 1 mW. Further-more, a target transmission range of the low-power wake-up receiver may be the same as a target transmission range of the legacy 802.11.

The second wireless device (420) according to an exemplary embodiment of this specification may transmit user data based on a main radio (i.e., 802.11). The second wireless device (420) may transmit a wake-up packet (WUP) for the WUR module (412).

Referring to FIG. 4, the second wireless device (420) may not transmit the user data or wake-up packet (WUP) for the first wireless device (410). In this case, the main radio module (411) included in the second wireless device (420) may be in the non-active state (i.e., OFF state), and the WUR module (412) may be in the turn-ON state (i.e., ON state).

Figure 5:
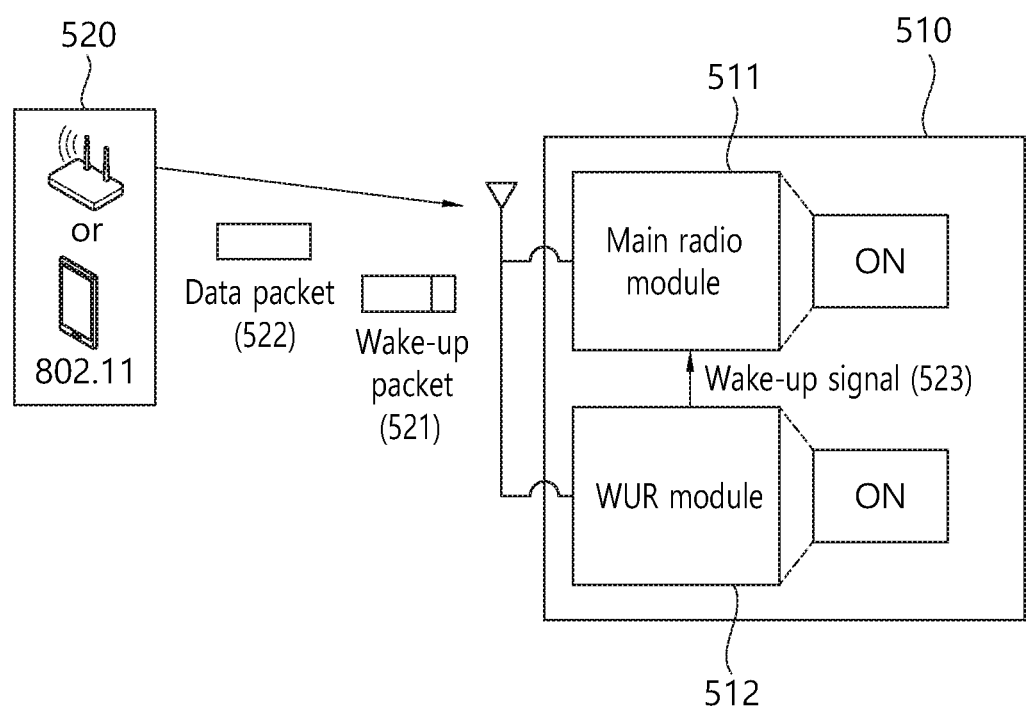
FIG. 5 is a conceptual diagram illustrating a method of receiving, by a wireless device, a wake-up packet and a data packet.

FIG. 5 is a conceptual diagram illustrating a method of receiving, by a wireless device, a wake-up packet and a data packet.

Referring to FIG. 4 and FIG. 5, a wireless LAN system (500) according to an exemplary embodiment of this specification may include a first wireless device (510) corresponding to a receiving device and a second wireless device corresponding to a transmitting device. The basic operations of the first wireless device (510) shown in FIG. 5 may be understood by referring to the description of the first wireless device (410) shown in FIG. 4. Similarly, the basic operations of the second wireless device (520) shown in FIG. 5 may be understood by referring to the description of the second wireless device (420) shown in FIG. 4.

Referring to FIG. 5, when a wake-up packet (521) is received by a WUR module (512) operating in the active state, the WUR module (512) may deliver (or transfer) a wake-up signal (523) to the main radio module (511), so that the main radio module (511) can accurately receive a data packet (522), which is to be received after the wake-up packet (521).

For example, the wake-up signal (523) may be implemented based on primitive information existing in the first wireless device (510).

For example, the main radio module (511) receives the wake-up signal (523), the main radio module (511) may activate all or part of a plurality circuits (not shown) supporting Wi-Fi, BT radio, and BLE radio, which are included in the main radio module (511).

As another example, actual data being included in the wake-up packet (521) may be directly delivered (or transferred) to a memory block (not shown) of the receiving device even if the main radio module (511) is in the non-active state.

As yet another example, if an IEEE 802.11 MAC frame is included in the wake-up packet (521), the receiving device may activate only a MAC processor of the main radio module (511). More specifically, the receiving device may maintain a PHY module of the main radio module (511) in the non-active state. The wake-up packet (521) of FIG. 5 will be described later on in more detail with reference to the accompanying drawing.

The second wireless device (520) may be configured to transmit the wake-up packet (521) to the first wireless device (510). For example, the second wireless device (520) may perform control operations so that the main radio module (511) of the first wireless device (510) can enter the active state (i.e., ON state) based on the wake-up packet (521).

Figure 6:
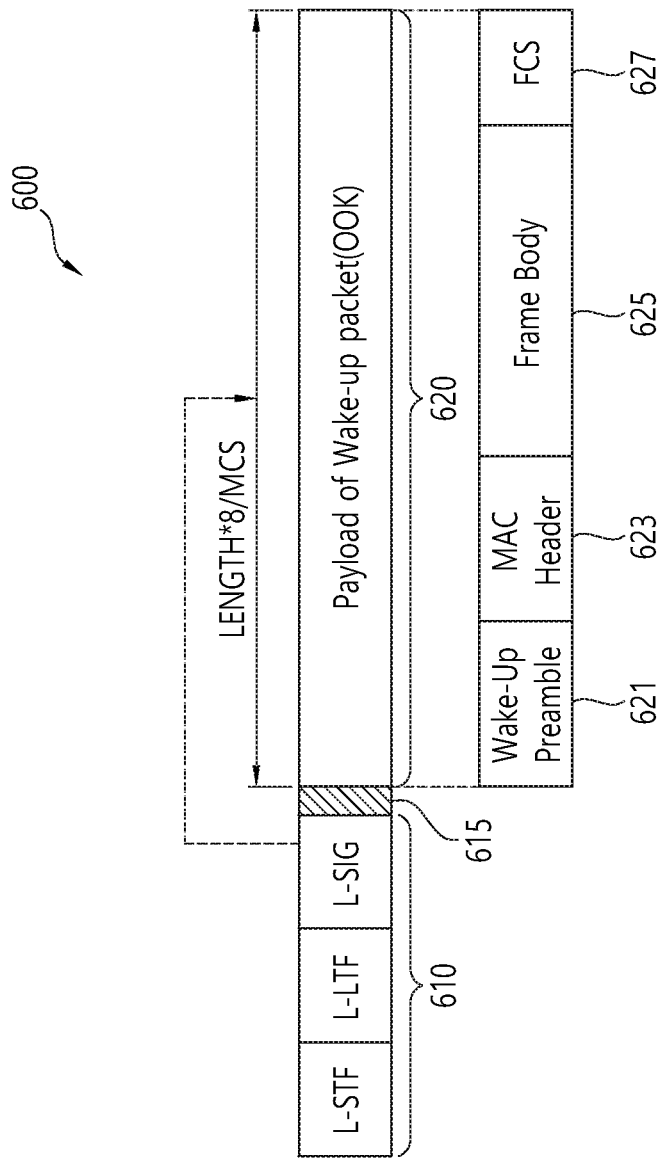
FIG. 6 illustrates an exemplary format of a wake-up packet.

FIG. 6 illustrates an exemplary format of a wake-up packet.

Referring to FIG. 1 to FIG. 6, a wake-up packet (600) may include at least one legacy preamble (610) or more. Additionally, the wake-up packet (600) may include a payload (620) after the legacy preamble (610). The payload (620) may be modulated by using a simple modulation scheme (e.g., the On-Off Keying (OOK) modulation scheme). The wake-up packet (600) including the payload may be transmitted based on a narrow bandwidth.

Referring to FIG. 1 to FIG. 6, the second wireless device (e.g., 520) may be configured to generate and/or transmit the wake-up packet (521, 600). The first wireless device (e.g., 510) may be configured to process the received wake-up packet (521).

For example, the wake-up packet (600) may include a legacy preamble (610), which is defined in the IEEE 802.11 specification, or another random preamble (not shown). The wake-up packet (600) may include one packet symbol (615) after the legacy preamble (610). Additionally, the wake-up packet (600) may include a payload (620).

The legacy preamble (610) may be provided for a coexistence with a legacy STA. The legacy preamble (610) being provided for the coexistence may be used by a L-SIG field, which is configured in order to protect the packet.

For example, through the L-SIG field within the legacy preamble (610), an 802.11 STA may detect a beginning (or a starting point) of the packet. And, through the L-SIG field within the legacy preamble (610), the STA may detect a beginning (or a starting point) of the 802.11 packet.

In order to reduce false alarms of the 802.11n terminal (or device or user equipment (UE)), one modulated symbol (615) may be added after the L-SIG of FIG. 6. The one symbol (615) may be modulated based on a BiPhase Shift Keying (BPSQ) scheme. The one symbol (615) may have a length of 4 us. And, the one symbol (615) may have a bandwidth of 20 MHz just as the legacy part.

The legacy preamble (610) may be understood as a field for a third party legacy STA (an STA not including an LP-WUR). In other words, the legacy preamble (610) may not be decoded by the LP-WUR.

The payload (620) may include a Wake-Up preamble field (621), a MAC header field (623), a Frame Body field (625), and a Frame Check Sequence (FCS) field (627).

The Wake-Up preamble field (621) may include a sequence for identifying the wake-up packet (600). For example, the Wake-Up preamble field (621) may include a Pseudo-Random Noise (PN) sequence.

The MAC header field (623) may include address information indicating a receiving device receiving the wake-up packet (600) (or an identifier of a receiving device). The Frame Body field (625) may include another information of the wake-up packet (600).

The Frame Body field (625) may include length information or size information of the payload. Referring to FIG. 6, the length information of the payload may be calculated (or operated) based on length information (LENGTH) and MCS information, which are included in the legacy preamble (610).

The FCS field (627) may include a cyclic redundancy check (CRC) value for performing error correction. For example, the FCS field (627) may include a CRC-8 value or a CRC-16 value for the MAC header field (623) and the Frame Body field (625).

Figure 7:
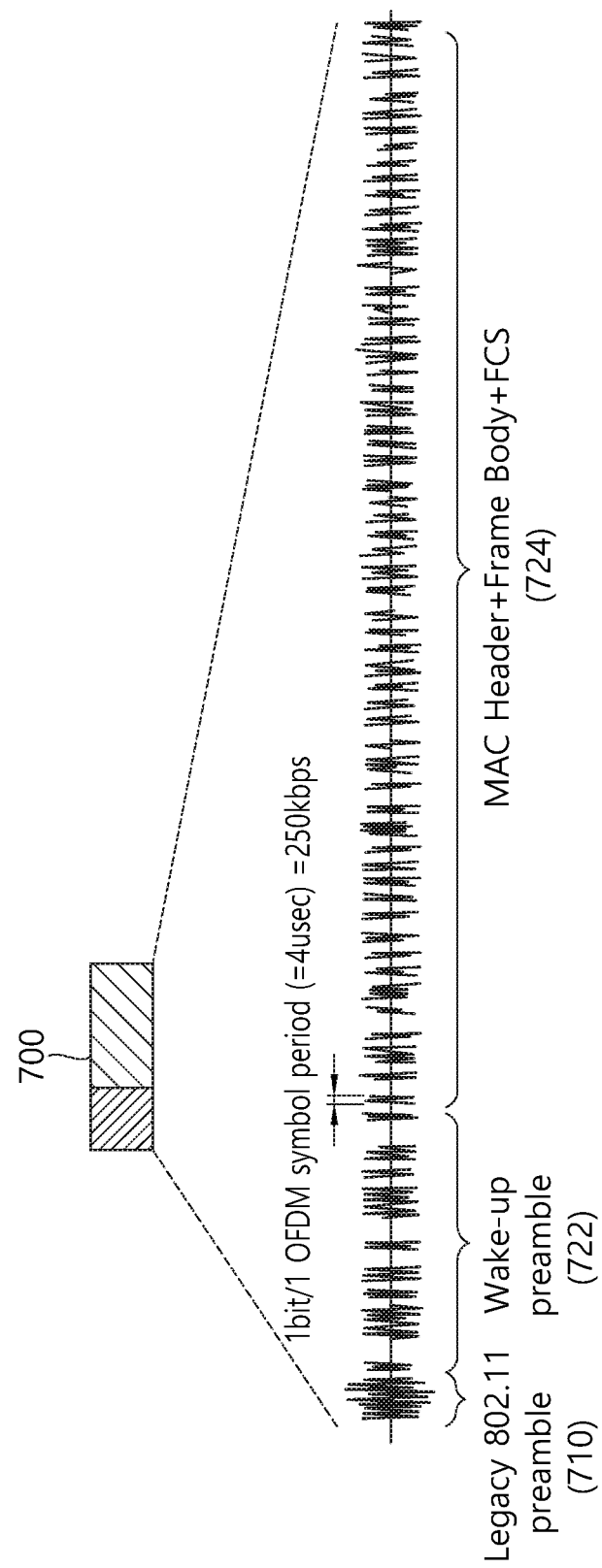
FIG. 7 illustrates a signal waveform of a wake-up packet.

FIG. 7 illustrates a signal waveform of a wake-up packet.

Referring to FIG. 7, a wake-up packet (700) includes a legacy preamble (802.11 preamble) (710) and a payload (722, 724) being modulated based on the On-Off Keying (OOK) scheme. In other words, the wake-up packet (WUP) according to the exemplary embodiment of this specification may be understood as being configured of a format in which a legacy preamble and a new LP-WUR signal waveform coexist.

The OOK scheme may not be applied to the legacy preamble (710) of FIG. 7. As described above, the payload (722, 724) may be modulated based on the OOK scheme. However, a wake-up preamble (722) included in the payload (722, 724) may be modulated based on a different modulation scheme.

For example. if the legacy preamble (710) is transmitted within a channel bandwidth of 20 MHz in which 64 FFT is applied, the payload (722, 724) may be transmitted within a channel bandwidth of approximately 4.06 MHz.

Figure 8:
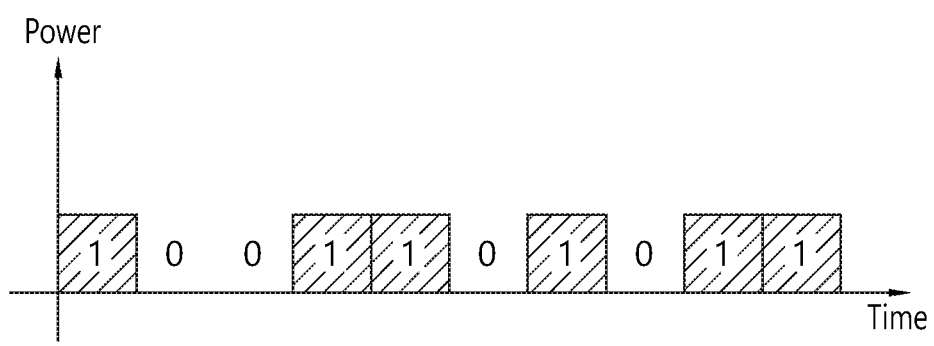
FIG. 8 illustrates a diagram for describing a principle for determining consumed power based on a ratio between bit values that configure information of a binary sequence format.

FIG. 8 illustrates a diagram for describing a principle for determining consumed power based on a ratio between bit values that configure information of a binary sequence format.

Referring to FIG. 8, information of a binary sequence format having '1' or '0' as the bit values may be expressed in the drawing. Communication according to the OOK modulation scheme may be performed based on the bit values included in the binary sequence format information.

For example, in case of using a light-emitting diode in visible light communication, in case the bit value configuring the binary sequence format information is equal to '1', the light-emitting diode may be turned on, and, in case the bit value is equal to '0', the light-emitting diode may be turned off.

As the receiving device receives and recovers the data being transmitted in the form of visible light based on the above-described flickering (or on and off state) of the light-emitting diode, the communication using visible light may be carried out. However, since the flickering of the light-emitting diode cannot be recognized by the human eye, people (or users) think and feel that the lighting is continuously maintained in the on state.

For simplicity in the description, as shown in FIG. 8, information of a binary sequence format having 10 bit values may be provided herein. For example, information of a binary sequence format having a value of '1001101011' may be provided herein.

As described above, in case the bit value is equal to '1', the transmitting device is turned on, and, in case the bit value is equal to '0', the transmitting device is turned off. Accordingly, among the above-mentioned 10 bit values, the symbols correspond to 6 bit values are turned on.

Since the wake-up receiver (WUR) according to the exemplary embodiment of this specification is included in the receiving device, transmission power of the transmitting device may not be significantly considered. One of the main reasons for using the OOK scheme in this exemplary embodiment is because the amount of consumed power during the decoding procedure of a received signal is considerably small.

Up until the time point where the decoding procedure is performed, the difference between the power consumed by the main radio and the power consumed by the WUR may be insignificant. However, as the decoding process is carried out by the receiving device, the difference in the amount of consumed power may become apparent (or significant) between the power being consumed by the main radio module and the power being consumed by the WUR module. The approximate amount of the consumed power is as shown below.

The conventional Wi-Fi power consumption is approximately 100 mW. More specifically, power may be consumed as follows: Resonator+Oscillator+PLL (1500 uW)→LPF (300 uW)→ADC (63 uW)→decoding processing (OFDM receiver) (100 mW).

However, the WUR power consumption is approximately 1 mW. More specifically, power may be consumed as follows: Resonator+Oscillator (600 uW)→LPF (300 uW)→ADC (20 uW)→decoding processing (Envelope detector) (1 uW).

Figure 9:
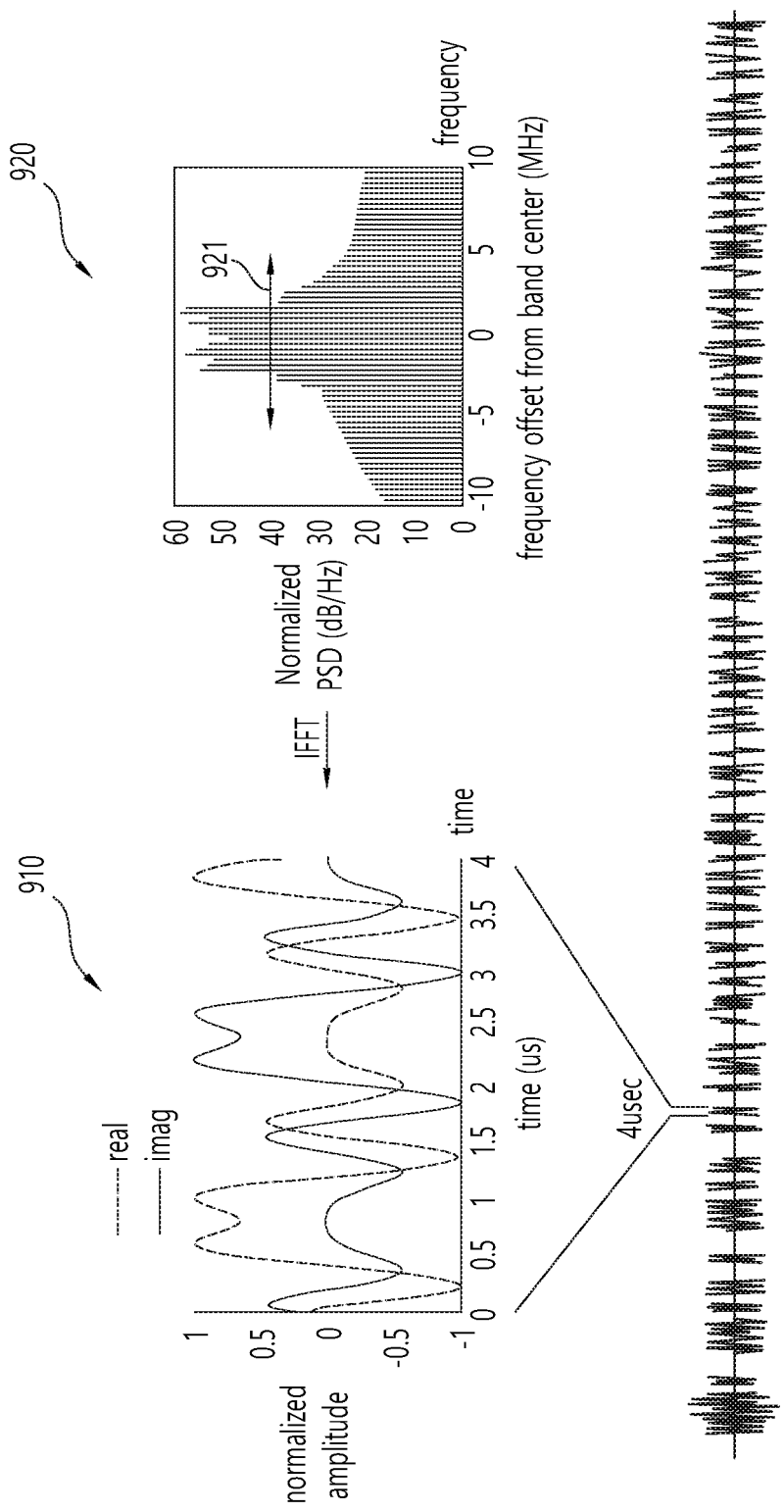
FIG. 9 illustrates a process of designing an OOK scheme.

FIG. 9 illustrates a process of designing an OOK scheme.

In order to generate a pulse according to the OOK scheme, the wireless device according to the exemplary embodiment of this specification may use an OFDM transmitting device of the legacy 802.11. The OFDM transmitting device of the legacy 802.11 may generate a sequence having 64 bits by applying 64-point IFFT.

Referring to FIG. 1 to FIG. 9, the wireless device according to the exemplary embodiment of this specification may transmit a payload of a wake-up packet (WUP), which is modulated based on the OOK scheme. The payload (e.g., 620 of FIG. 6) according to the exemplary embodiment of this specification may be implemented based on an ON-signal and an OFF-signal.

The OOK scheme may be applied for the ON-signal, which is included in the payload (e.g., 620 of FIG. 6) of the wake-up packet. In this case, the ON-signal may correspond to a signal having an actual power value.

Referring to a frequency domain graph (920), the ON-signal that is included in the payload (e.g., 620 of FIG. 6) may be acquired by performing IFFT on N2 number of subcarriers (wherein N2 is an integer) among N1 number of subcarriers (wherein N1 is an integer) corresponding to the channel band of the wake-up packet (WUP). Additionally, a predetermined sequence may be applied to the N2 number of subcarriers.

For example, the channel band of the wake-up packet (WUP) may correspond to 20 MHz. The N1 number of subcarriers may correspond to 64 subcarriers, and the N2 number of subcarriers may correspond to 13 consecutive subcarriers (921 of FIG. 9). Subcarrier spacing being applied to the wake-up packet (WUP) may be equal to 312.5 kHz.

The OOK scheme may be applied for the OFF-signal, which is included in the payload (e.g., 620 of FIG. 6) of the wake-up packet. In this case, the OFF-signal may correspond to a signal that does not have an actual power value. More specifically, the OFF-signal may not be considered in the configuration of the wake-up packet (WUP).

The ON-signal, which is included in the payload (e.g., 620 of FIG. 6) of the wake-up packet, may be determined (i.e., demodulated) as a 1-bit ON-signal (i.e., '1') by the WUR module (e.g., 512 of FIG. 5). Similarly, the OFF-signal, which is included in the payload (e.g., 620 of FIG. 6) of the wake-up packet, may be determined (i.e., demodulated) as a 1-bit ON-signal (i.e., '0') by the WUR module (e.g., 512 of FIG. 5).

A specific sequence may be preconfigured (or predetermined) for the subcarrier set (921) of FIG. 9. For example, among the 13 sequences, a coefficient corresponding to a DC subcarrier may be set to '0', and the remaining coefficients may be set to '1' or '−1'.

Referring to the frequency domain graph (920), the subcarrier set (921) may correspond to subcarriers having subcarrier indexes ranging from '−6' to '+6'.

For example, among the 13 subcarriers, coefficients corresponding to the subcarriers having subcarrier indexes ranging from '−6' to '−1' may be set to '1' or '−1'. Also, among the 13 subcarriers, coefficients corresponding to the subcarriers having subcarrier indexes ranging from '1' to '6' may be set to '1' or '−1'.

For example, among the 13 subcarriers, subcarriers each having a subcarrier index of '0' may be nulled. Coefficients of the remaining subcarriers excluding the subcarrier set (921) (subcarriers having subcarrier indexes ranging from '−32' to '−7' and subcarriers having subcarrier indexes ranging from '+7' to '+31') may all be set to '0'.

The subcarrier set (921) corresponding to the 13 consecutive subcarriers may be configured to have a channel bandwidth of approximately 4.06 MHz. More specifically, in the 20 MHz band for the wake-up packet (WUP), the power caused by the signals may be concentrated in the 4.06 MHz.

When using the pulse according to the OOK scheme based on the exemplary embodiment of this specification, by concentrating the power to a specific band, it will be advantageous in that a Signal to Noise Ratio (SNR) may be increased, and that power consumption in an AC/DC converter of the receiving device may be reduced. Since the sampling frequency band is reduced to 4.06 MHz, the power consumed by the wireless device may be reduced accordingly.

The OFDM transmitting device of the legacy 802.11 according to the exemplary embodiment of this specification may perform IFFT (e.g., 64-point IFFT) for N2 number of subcarriers (e.g., 13 consecutive subcarriers), among N1 number of subcarriers (e.g., 64 subcarriers) corresponding to the channel band (e.g., a 20 MHz band) of the wake-up packet.

In this case, a predetermined (or preconfigured) sequence may be applied to the N2 number of subcarriers. Accordingly, one ON-signal may be generated in the time domain. The 1-bit information corresponding to one ON-signal may be delivered (or transferred) through one symbol.

For example, when the 64-point IFFT is performed, a symbol having a length of 3.2 us that corresponds to the subcarrier set (921) may be generated. Additionally, if a cyclic prefix (CP) (0.8 us) is added to the symbol having a length of 3.2 us that corresponds to the subcarrier set (921), as shown in the time domain graph (910) of FIG. 9, one symbol having a total length of 4 us may be generated.

Additionally, the OFDM transmitting device of the 802.11 may not be capable of transmitting the OFF-signal at all.

According to the exemplary embodiment of this specification, the first wireless device (e.g., 510 of FIG. 5) including the WUR module (e.g., 512 of FIG. 5) may demodulate the received packet based on an envelope detector, which extracts an envelope of a reception signal.

For example, the WUR module (e.g., 512 of FIG. 5) according to the exemplary embodiment of this specification may perform a comparison between a power level of the acquired reception signal and a predetermined threshold level by using an envelope of the reception signal.

If the power level of the reception signal is greater than the threshold level, the WUR module (e.g., 512 of FIG. 5) may determine the reception signal as a 1-bit ON-signal (i.e., '1'). And, if the power level of the reception signal is lower than the threshold level, the WUR module (e.g., 512 of FIG. 5) may determine the reception signal as a 1-bit OFF-signal (i.e., '0').

According to the exemplary embodiment of this specification, a basic data rate for one information may correspond to 125 Kbps (8 us) or 62.5 Kbps (16 us).

By generalizing the description of FIG. 9, each signal having a length of K (e.g., K is an integer) in the 20 MHz band may be transmitted based on K number of consecutive subcarriers, among the 64 subcarriers for the 20 MHz band. For example, K may correspond to a number of subcarriers being used for transmitting the signal. Additionally, K may correspond to the bandwidth of a pulse according to the OOK scheme.

Among the 64 subcarriers, the coefficients of the remaining subcarriers after excluding the K number of subcarriers may also be set to '0'.

More specifically, for the 1-bit OFF-signal corresponding to '0' (hereinafter referred to as Information 0) and the 1-bit ON-signal corresponding to '1' (hereinafter referred to as Information 1), the same K number of subcarriers may be used. For example, the index for the K number of subcarriers that are used may be expressed as 33−floor(K/2):33+ceil(K/2)−1.

At this point, Information 1 and Information 0 may have the following values.

Information 0=zeros(1,K)
Information 1=alpha*ones(1,K)

The alpha is a power normalization factor and may, for example, be equal to 1/sqrt(K).

Figure 10:
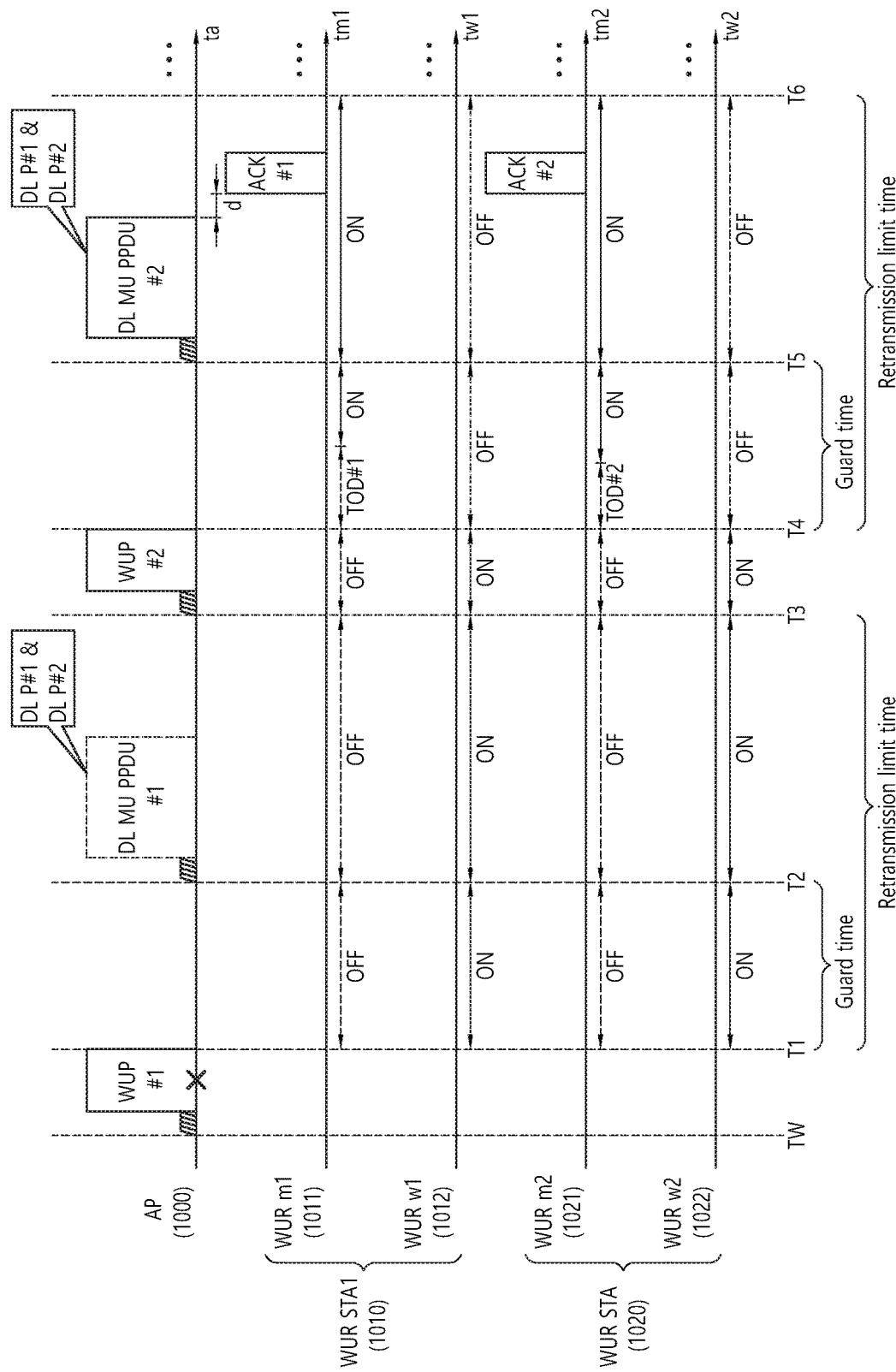
FIG. 10 is a diagram illustrating a method for power management in a wireless LAN system according to an exemplary embodiment of this specification.

FIG. 10 is a diagram illustrating a method for power management in a wireless LAN system according to an exemplary embodiment of this specification.

Referring to FIG. 10, a horizontal axis of an access point (AP) (1000) may indicate time (ta), and a vertical axis may be related to the presence of a frame that is to be transmitted by the AP (1000).

A first WUR device (1010) may include a first main radio module (1011) and a first WUR module (1012). For example, the first main radio module (1011) may correspond to the main radio module (511) of FIG. 5. And, the first WUR module (1012) may correspond to the WUR module (512) of FIG. 5.

A horizontal axis of the first main radio module (1011) may indicate time (tm1). Additionally, arrows marked below the horizontal axis of the first main radio module (1011) may indicate the power status (e.g., ON state or OFF state) of the first main radio module (1011). And, a vertical axis of the first main radio module (1011) may be related to the presence of a frame that is to be transmitted by the first main radio module (1011).

A horizontal axis of the first WUR module (1012) may indicate time (tw1). Additionally, arrows marked below the horizontal axis of the first WUR module (1012) may indicate the power status (e.g., ON state or OFF state) of the first WUR module (1012). And, a vertical axis of the first WUR module (1012) may be related to the presence of a frame that is to be transmitted by the first WUR module (1012).

A horizontal axis of a second main radio module (1021) may indicate time (tm2). Additionally, arrows marked below the horizontal axis of the second main radio module (1021) may indicate the power status (e.g., ON state or OFF state) of the second main radio module (1021). And, a vertical axis of the second main radio module (1021) may be related to the presence of a frame that is to be transmitted by the second main radio module (1021).

A horizontal axis of a second WUR module (1022) may indicate time (tw2). Additionally, arrows marked below the horizontal axis of the second WUR module (1022) may indicate the power status (e.g., ON state or OFF state) of the second WUR module (1022). And, a vertical axis of the second WUR module (1022) may be related to the presence of a frame that is to be transmitted by the second WUR module (1022).

It is shown in FIG. 10 that the plurality of WUR devices correspond to a first WUR device (1010) and a second WUR (1020). However, it should be understood that this specification will not be limited only to this.

It may be assumed that the first WUR device (1010) and the second WUR device (1020) correspond to wireless devices being associated with the AP through an association procedure. Additionally, it may be assumed that the first main radio module (1011) of the first WUR device (1010) of FIG. 10 is a non-active state (i.e., OFF-state) and that the first WUR module (1012) is in a turn-ON state (i.e., ON-state).

Similarly, it may be assumed that the second main radio module (1021) of the second WUR device (1020) of FIG. 10 is a non-active state (i.e., OFF-state) and that the second WUR module (1022) is in a turn-ON state (i.e., ON-state).

During a wake-up section (TW~T1) of FIG. 10, the AP (1000) may transmit a first wake-up packet (hereinafter referred to as 'WUP #1').

For example, the first wake-up packet (WUP #1) may inform the first main radio module (1011) of the first WUR device (1010) and the second main radio module (1021) of the second WUR device (1020) to enter the active state based on a multicast scheme.

As another example, the first wake-up packet (WUP #1) may inform all main radio modules included in all WUR devices having received the first wake-up packet (WUP #1) to enter the active state based on a broadcast scheme.

The first wake-up packet (WUP #1) of FIG. 10 may include a first payload, which is modulated based on the On-Off Keying (OOK) scheme for the first WUR module (1012). Also, the first wake-up packet (WUP #1) may include a second payload, which is modulated based on the OOK scheme for the second WUR module (1022).

For example, the first payload may be embodied based on an ON-signal, which is determined as a 1-bit ON-signal by the first WUR module (1012), and an OFF-signal, which is determined as a 1-bit OFF-signal by the first WUR module (1012).

Similarly, the second payload may be embodied based on an ON-signal, which is determined as a 1-bit ON-signal by the second WUR module (1022), and an OFF-signal, which is determined as a 1-bit OFF-signal by the second WUR module (1022).

Additionally, the ON-signal being included in the first payload and the second payload may be acquired by performing Inverse Fast Fourier Transform (IFFT) for N2 number of subcarriers, among the N1 number of subcarriers corresponding to the channel band of the first wake-up packet (WUP #1). For example, a predetermined sequence may be applied to the N2 number of subcarriers. Herein, N1 and N2 may be integers.

However, due to diverse reasons (e.g., a case where the channel status of the wireless channel corresponds to a busy state), it will be assumed that the first wake-up packet (WUP #1) of FIG. 10 is not received by the first WUR module (1012) of the first WUR device (1010) and the second WUR module (1022) of the second WUR device (1020).

A guard time according to the first wake-up packet (WUP #1) may be understood as a first section (T1~T2) of FIG. 10. In this case, the first section (T1~T2) of FIG. 10 may be configured based on a parameter, which is configured in advance for the guard time.

Until a point where the first section (T1~T2) of FIG. 10 corresponding to the guard time is elapsed, the AP (1000) may be on stand-by (or wait) without transmitting any downlink packet for the first WUR station (1010).

For example, the parameter, which is configured in advance for the guard time, may correspond to a value that is separately configured during an association procedure between the AP (1000) and each WUR STA (e.g., 1010 or 1020). For example, the guard time that is configured for the first and second WUR STAs (1010, 1020) of FIG. 10 may be configured to have the same time section (e.g., T1~T2 of FIG. 10).

During the first section (T1~T2) corresponding to the guard time, the AP (1000) may buffer a plurality of downlink packets (DL P #1, DL P #2) to transmission queues (not shown) of the AP (1000).

For example, the first downlink packet (DL P #1) may include a plurality of first data frames (e.g., A-MPDU) that are addressed to the first WUR device (1010). The second downlink packet (DL P #2) may include a plurality of second data frames (e.g., A-MPDU) that are addressed to the second WUR device (1020).

During the first section (T1~T2) of FIG. 10, the first WUR device (1010) may perform control operations so that the first main radio module (1011) can maintain the power status (i.e., OFF state) of the previous section (TW~T1). Additionally, the first WUR device (1010) may perform control operations so that the first WUR module (1012) can maintain the power status (i.e., ON state) of the previous section (TW~T1).

During the first section (T1~T2) of FIG. 10, the second WUR device (1020) may perform control operations so that the second main radio module (1021) can maintain the power status (i.e., OFF state) of the previous section (TW~T1). Additionally, the second WUR device (1020) may perform control operations so that the second WUR module (1022) can maintain the power status (i.e., ON state) of the previous section (TW~T1).

During a second section (T2~T3) of FIG. 10, the AP (1000) may transmit a first DL MU PPDU (DL MU PPDU #1) including the first downlink packet (DL P #1) and the second downlink packet (DL P #2).

The first DL MU PPDU (DL MU PPDU #1) may be received based on each main radio module (e.g., 1011, 1021) that is in the active state. However, in the second section (T2~T3) of FIG. 10, each main radio module (e.g., 1011, 1021) is in the non-active (i.e., OFF state). Accordingly, the first WUR device (1010) and the second WUR device (1020) cannot receive the first DL MU PPDU (DL MU PPDU #1).

Since each main radio module (e.g., 1011, 1021) is in the non-active (i.e., OFF state), a first acknowledgement packet corresponding to the first downlink packet (DL P #1) and a second acknowledgement packet corresponding to the second downlink packet (DL P #2) are not received.

Accordingly, if a stand-by time (or waiting time) being predetermined in advance for retransmission is elapsed, the AP (1000) may perform retransmission of the first DL MU PPDU (DL MU PPDU #1) including the first downlink packet (DL P #1) and the second downlink packet (DL P #2).

For a clearer and briefer description of FIG. 10, it may be assumed that a retransmission limit time (hereinafter referred to as 'RLT') according to the first wake-up packet (WUP #1) is expired earlier than a time interval for performing the retransmission operation of the first DL MU PPDU (DL MU PPDU #1).

According to this assumption, until the second section (T2~T3) of FIG. 10 is elapsed, the AP (1000) cannot receive the first acknowledgement packet (e.g., Block Ack frame) corresponding to the first downlink packet (DL P #1) from the first WUR device (1010). Similarly, until the second section (T2~T3) of FIG. 10 is elapsed, the AP (1000) cannot receive the second acknowledgement packet (e.g., Block Ack frame) corresponding to the second downlink packet (DL P #2) from the second WUR device (1020).

The retransmission limit time (RLT) according to the first wake-up packet (WUP #1) may be understood as a time section (i.e., T1~T3 of FIG. 10) corresponding to the first section and the second section of FIG. 10. In this case, the first section and the second section of FIG. 10 (i.e., T1~T3 of FIG. 10) may be configured based on a parameter, which is predetermined in advance for the retransmission limit time (RLT).

For example, the parameter, which is configured in advance for the retransmission limit time (RLT), may correspond to a value that is separately configured during an association procedure between the AP (1000) and each WUR STA (e.g., 1010 or 1020). For example, the retransmission limit time (RLT) that is configured for the first and second WUR STAs (1010, 1020) of FIG. 10 may be configured to have the same time section (e.g., T1~T3 of FIG. 10).

During a third section (T3~T4) of FIG. 10, a second wake-up packet (WUP #2) may be transmitted. Even after the retransmission limit time (e.g., T1~T3 of FIG. 10) is elapsed, the AP (1000) may perform control operations so that a transmission queue (not shown) of the AP (1000) can buffer the first downlink packet (DL P #1) for the first WUR device (1010) and the second downlink packet (DL P #2) for the second WUR device (1020).

The second wake-up packet (WUP #2) may include the same information according to the same method as the first wake-up packet (WUP #1). For example, the second wake-up packet (WUP #2) may inform the first main radio module (1011) of the first WUR device (1010) and the second main radio module (1021) of the second WUR device (1020) to enter the active state based on a multicast scheme.

As another example, the second wake-up packet (WUP #2) may inform all main radio modules included in all WUR devices having received the second wake-up packet (WUP #2) to the active state based on a broadcast scheme.

Additionally, the second wake-up packet (WUP #2) of FIG. 10 may include a first payload, which is modulated based on the OOK scheme for the first WUR module (1012). Also, the second wake-up packet (WUP #2) may include a second payload, which is modulated based on the OOK scheme for the second WUR module (1022).

For example, the first payload may be embodied based on an ON-signal, which is determined as a 1-bit ON-signal by the first WUR module (1012), and an OFF-signal, which is determined as a 1-bit OFF-signal by the first WUR module (1012).

Similarly, the second payload may be embodied based on an ON-signal, which is determined as a 1-bit ON-signal by the second WUR module (1022), and an OFF-signal, which is determined as a 1-bit OFF-signal by the second WUR module (1022).

Additionally, the ON-signal being included in the first payload and the second payload may be acquired by performing Inverse Fast Fourier Transform (IFFT) for N2 number of subcarriers, among the N1 number of subcarriers corresponding to the channel band of the second wake-up packet (WUP #2). For example, a predetermined sequence may be applied to the N2 number of subcarriers. Herein, N1 and N2 may be integers.

It may be assumed that the second wake-up packet (WUP #2) of FIG. 10 is successfully received based on the first WUR module (1012) of the first WUR device (1010) and the second WUR module (1022) of the second WUR device (1020).

A guard time according to the second wake-up packet (WUP #2) may be understood as a fourth section (T4~T5) of FIG. 10. In this case, the fourth section (T4~T5) of FIG. 10 may be configured based on a parameter, which is configured in advance for the guard time.

At a point of entry (T4) to the fourth section (T4~T5) of FIG. 10, the first WUR device (1010) may deliver (or transfer) a first wake-up signal to the first main radio module (1011). The first wake-up signal (e.g., 523 of FIG. 5) may be understood as an internal primitive information of the first WUR device (1010), which is used for the first main radio module (1011) to the active state (i.e., ON state).

More specifically, a time consumed for the first main radio module (1011) to enter the active state (i.e., ON state) based on the first wake-up signal (e.g., 523 of FIG. 5) may be referred to as a first turn-on delay (hereinafter referred to as 'TOD').

For example, in addition to the time according to the internal primitive information of the first WUR device (1010), the first turn-on delay (TOD #1) may also include a time for an association of the first WUR device (1010) with the AP (1000) based on the first main radio module (1011).

When the first turn-on delay (TOD #1) of the first main radio module (1011) is elapsed, the first main radio module (1011) may enter the active state (i.e., ON state). Subsequently, up to a time point (T5) where the fourth section (T4~T5) is ended, the first WUR device (1010) may perform control operations so that the first main radio module (1011) can maintain the active state (i.e., ON state).

Additionally, at a point of entry (T4) to the fourth section (T4~T5) of FIG. 10, the first WUR device (1010) may perform control operations so that the first WUR module (1012) can enter a turn-OFF state (i.e., OFF state). Thereafter, until an ending point (T5) of the fourth section (T4~T5) of FIG. 10, the first WUR device (1010) may perform control operations so that the first WUR module (1012) can maintain the turn-OFF state (i.e., OFF state).

For reference, a turn-off delay (not shown) for allowing the first WUR module (1012) to enter the turn-off state may exist. However, the turn-off delay may have a value that is relatively smaller than the first turn-on delay (TOD #1).

Similarly, at a point of entry (T4) to the fourth section (T4~T5) of FIG. 10, the second WUR device (1020) may deliver (or transfer) a second wake-up signal to the second main radio module (1021). The second wake-up signal (e.g., 523 of FIG. 5) may be understood as an internal primitive information of the second WUR device (1020), which is used for the second main radio module (1021) to enter the active state (i.e., ON state).

More specifically, a time consumed for the second main radio module (1021) to enter the active state (i.e., ON state) based on the second wake-up signal (e.g., 523 of FIG. 5) may be referred to as a second turn-on delay (TOD #2).

For example, in addition to the time according to the internal primitive information of the second WUR device (1020), the second turn-on delay (TOD #2) may also include a time for an association of the second WUR device (1020) with the AP (1000) based on the second main radio module (1021).

When the second turn-on delay (TOD #2) of the second main radio module (1021) is elapsed, the second main radio module (1021) may enter the active state (i.e., ON state). Subsequently, up to a time point (T5) where the fourth section (T4~T5) is ended, the second WUR device (1020) may perform control operations so that the second main radio module (1021) can maintain the active state (i.e., ON state).

Additionally, at a point of entry (T4) to the fourth section (T4~T5) of FIG. 10, the second WUR device (1020) may perform control operations so that the second WUR module (1022) can enter a turn-OFF state (i.e., OFF state). Thereafter, until an ending point (T5) of the fourth section (T4~T5) of FIG. 10, the second WUR device (1020) may perform control operations so that the second WUR module (1022) can maintain the turn-OFF state (i.e., OFF state).

Additionally, as shown in FIG. 10, a time length for each turn-on delay (TOD #1, TOD #2), which corresponds to a time required for shifting the main radio module (e.g., 1011 or 1021) from the non-active state to the active state, may vary for each WUR device.

In a fifth section (T5~T6) of FIG. 10, the AP (1000) may transmit a second DL MU PPDU (DL MU PPDU #2) including a first downlink packet (DL P #1) for the first WUR device (1010) and a second downlink packet (DL P #2) for the second WUR device (1020).

For example, the first downlink packet (DL P #1) and the second downlink packet (DL P #2) of the fifth section (T5~T6) may include the same information as the second downlink packet (DL P #2) of the above-described second section.

In the fifth section (T5~T6) of FIG. 10, the first WUR device (1010) may receive the second DL MU PPDU (DL MU PPDU #2) based on the first main radio module (1011) being in the active state (i.e., ON state). Similarly, the second WUR device (1020) may receive the second DL MU PPDU (DL MU PPDU #2) based on the second main radio module (1021) being in the active state (i.e., ON state).

When a predetermined period of time (d) is elapsed after the transmission of the second DL MU PPDU (DL MU PPDU #2), the AP (1000) may simultaneously receive a first acknowledgement packet (ACK #1) and a second acknowledgement packet (ACK #2). For example, the predetermined period of time (d) may correspond to an SIFS.

More specifically, the AP (1000) may receive the first acknowledgement packet (ACK #1) from the first WUR device (1010). For example, the first acknowledgement packet (ACK #1) may correspond to a frame for notifying a successful reception of the first downlink packet (DL P #1). Herein, the first acknowledgement packet (ACK #1) may be transmitted based on the first main radio module (1011) of the first WUR device (1010).

Additionally, the AP (1000) may receive the second acknowledgement packet (ACK #2) from the second WUR device (1020). For example, the second acknowledgement packet (ACK #2) may correspond to a frame for notifying a successful reception of the second downlink packet (DL P #2). Herein, the second acknowledgement packet (ACK #2) may be transmitted based on the second main radio module (1021) of the second WUR device (1020).

After the transmission of the first acknowledgement packet (ACK #1), if it is determined that there is no data packet that is to be received based on the first main radio module (1011), the first WUR device (1010) may perform control operations so that the first main radio module (1011) can once again enter the non-active state (i.e., OFF state).

Additionally, after the transmission of the first acknowledgement packet (ACK #1), if it is determined that there is no data packet that is to be received based on the first main radio module (1011), the first WUR device (1010) may perform control operations so that the first WUR module (1012) can once again enter the turn-ON state (i.e., ON state).

Similarly, after the transmission of the second acknowledgement packet (ACK #2), if it is determined that there is no data packet that is to be received based on the second main radio module (1021), the second WUR device (1020) may perform control operations so that the second main radio module (1021) can once again enter the non-active state (i.e., OFF state).

Additionally, after the transmission of the second acknowledgement packet (ACK #2), if it is determined that there is no data packet that is to be received based on the second main radio module (1021), the second WUR device (1020) may perform control operations so that the second WUR module (1022) can once again enter the turn-ON state (i.e., ON state).

The retransmission limit time (RLT #2) according to the second wake-up packet (WUP #2) may be understood as a time section (i.e., T4~T6 of FIG. 10) corresponding to the fourth and fifth sections of FIG. 10. In this case, the fourth and fifth sections (T4~T6) of FIG. 10 may be configured based on a predetermined parameter for the retransmission limit time (RLT).

Referring to FIG. 10, the first wake-up packet (WUP #1), the second wake-up packet (WUP #2), the first DL MU PPDU (DL MU PPDU #1), and the second DL MU PPDU (DL MU PPDU #2) may be understood as frames being transmitted based on a contention for the wireless channel.

In the exemplary embodiment shown in FIG. 10, although the retransmission limit time (RLT) is described as a predetermined time section, it shall be understood that this specification will not be limited only to this.

For example, the retransmission limit time (RLT) may be equal to a value corresponding a predetermined threshold number of times (e.g., 3 times) for the retransmission of the DL MU PPDU. For example, if the number of retransmissions of the DL MU PPDU reaches the threshold number of times, which is equal to 3, the AP may transmit a wake-up packet (WUP) instead of performing a fourth retransmission of the DL MU PPDU.

Additionally, the retransmission limit time (RLT) being mentioned in this specification may be configured as a unique value for each WUR device during a process of associating each WUR device with the AP or during a process after the association between the AP and each WUR device. Each of the WUR devices may notify a value corresponding to the retransmission limit time (RLT) to the AP. The AP may then store a value corresponding to the retransmission limit time (RLT), which is a unique value, for each WUR device. Alternatively, the retransmission limit time (RLT) may correspond to a value that is predetermined for each wireless device (or terminal) by using a provision method in advance.

Figure 11:
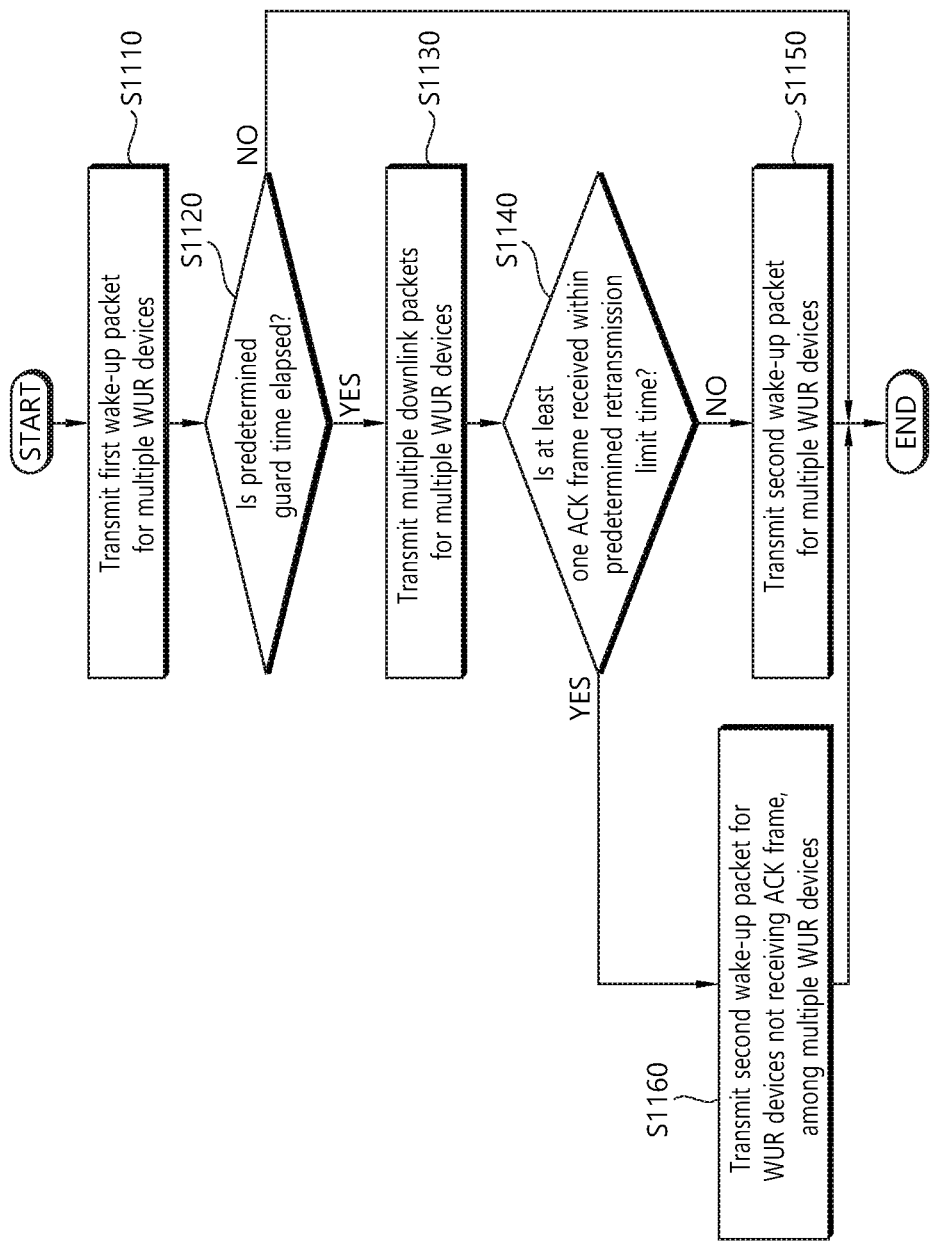
FIG. 11 is a flow chart illustrating a method for power management in a wireless LAN system according to an exemplary embodiment of this specification.

FIG. 11 is a flow chart illustrating a method for power management in a wireless LAN system according to an exemplary embodiment of this specification.

Referring to FIG. 10 and FIG. 11, in step S1110, the AP may transmit a first wake-up packet for a plurality of WUR devices. For example, the first wake-up packet (e.g., WUP #1 of FIG. 10) may be transmitted based on the multicast scheme or the broadcast scheme. Additionally, each of the plurality of WUR devices according to the exemplary embodiment of this specification may include a main radio module and a WUR module.

For example, a first WUR device (e.g., 1010 of FIG. 10) may include a first main radio module (e.g., 1011 of FIG. 10) and a first WUR module (e.g., 1012 of FIG. 10). And, a second WUR device (e.g., 1020 of FIG. 10) may include a second main radio module (e.g., 1021 of FIG. 10) and a second WUR module (e.g., 1022 of FIG. 10).

The AP (e.g., 1000 of FIG. 10) may transmit the first wake-up packet (e.g., WUP #1 of FIG. 10) for the first WUR device (e.g., 1010 of FIG. 10) and the second WUR device (e.g., 1020 of FIG. 10).

In this case, the first wake-up packet according to the exemplary embodiment of this specification may inform each of the main radio modules included in each of the plurality WUR devices to enter an active state. For example, the first wake-up packet (e.g., WUP #1 of FIG. 10) may inform the first main radio module (e.g., 1011 of FIG. 10) and the second main radio module (e.g., 1021 of FIG. 10) to enter the active state (i.e., ON state).

Additionally, the first wake-up packet may include a plurality of payloads being modulated according to the On-Off Keying (OOK) scheme for the WUR module included in each of the plurality of WUR devices. For example, the first wake-up packet (e.g., WUP #1 of FIG. 10) may include a first payload being modulated according to the OOK scheme for the first WUR module (e.g., 1012 of FIG. 10) and a second payload being modulated according to the OOK scheme for the second WUR module (e.g., 1022 of FIG. 10).

In step S1120, the AP may determine whether or not a predetermined guard time is elapsed. For example, the predetermined guard time may be understood as a time section (e.g., T1~T2 of FIG. 10) being counted based on a time point (e.g., T1 of FIG. 10) where the transmission of the first wake-up packet (e.g., WUP #1 of FIG. 10) by the AP (e.g., 1000 of FIG. 10) is completed.

If it is determined that the guard time is not elapsed, the process may be ended. If it is determined that the guard time is elapsed, the process may enter step S1130.

In step S1130, the AP may transmit a plurality of downlink packets for the plurality of WUR devices. For example, the AP (e.g., 1000 of FIG. 10) may transmit a DL MU PPDU (e.g., DL MU PPDU #1 of FIG. 10), which includes a first downlink packet (e.g., DL P #1 of FIG. 10) and a second downlink packet (e.g., DL P #2 of FIG. 10).

For example, the first downlink packet (e.g., DL P #1 of FIG. 10) may correspond to a packet being buffered to a transmission queue (not shown) of the AP (1000) for the first WUR device (e.g., 1010 of FIG. 10). And, the second downlink packet (e.g., DL P #2 of FIG. 10) may correspond to a packet being buffered to a transmission queue (not shown) of the AP (1000) for the second WUR device (e.g., 1020 of FIG. 10).

In the viewpoint of a receiver, the first WUR device (e.g., 1010 of FIG. 10) may receive the first downlink packet (e.g., DL P #1 of FIG. 10) based on the first main radio module (e.g., 1011 of FIG. 10) being in the active state (i.e., ON state).

Similarly, the second WUR device (e.g., 1020 of FIG. 10) may receive the second downlink packet (e.g., DL P #2 of FIG. 10) based on the second main radio module (e.g., 1021 of FIG. 10) being in the active state (i.e., ON state).

In step S1140, the AP may determine whether or not at least one acknowledgement (hereinafter referred to as 'ACK') frame is received within a predetermined retransmission limit time (RLT).

For example, the predetermined retransmission limit time (RLT) may be understood as a time section (e.g., T1~T3 of FIG. 10) being counted based on a time point (e.g., T1 of FIG. 10) where the transmission of the first wake-up packet (e.g., WUP #1 of FIG. 10) by the AP (e.g., 1000 of FIG. 10) is completed.

If at least one acknowledgement (ACK) frame is received within the predetermined retransmission limit time (RLT), the process may enter step S1160. If at least one acknowledgement (ACK) frame is not received within the predetermined retransmission limit time (RLT), the process may enter step S1150.

In step S1150, the AP may transmit a second wake-up packet for the plurality of WUR devices. For example, the second wake-up packet (e.g., WUP #2 of FIG. 10) may be transmitted based on the multicast scheme or the broadcast scheme.

For example, the second wake-up packet (e.g., WUP #2 of FIG. 10) may indicate the first main radio module (e.g., 1011 of FIG. 10) of the first WUR device (e.g., 1010 of FIG. 10) and the second main radio module (e.g., 1021 of FIG. 10) of the second WUR device (e.g., 1020 of FIG. 10) to enter the active state (i.e., ON state).

Additionally, the second wake-up packet may include a plurality of payloads being modulated according to the On-Off Keying (OOK) scheme for the WUR module included in each of the plurality of WUR devices. For example, the second wake-up packet (e.g., WUP #2 of FIG. 10) may include a first payload being modulated according to the OOK scheme for the first WUR module (e.g., 1012 of FIG. 10) and a second payload being modulated according to the OOK scheme for the second WUR module (e.g., 1022 of FIG. 10).

In step S1160, the AP may transmit the second wake-up packet for at least one WUR device that has not received the ACK frame, among the plurality of WUR devices. In other words, the AP may indicate the main radio module of the at least one WUR device that has not received an ACK frame to enter the active state based on the second wake-up packet.

The guard time and the retransmission limit time that are mentioned in FIG. 11 may correspond to values that are predetermined while performing the association procedure between the AP and each WUR station. Additionally, the guard time and the retransmission limit time may be separately configured for each WUR STA.

According to the exemplary embodiment of this specification that is described in FIG. 10 and FIG. 11, a time period during which the main radio module of the wireless device unnecessarily maintains the active state may be reduced. More specifically, according to the exemplary embodiment of this specification, the consumption of stand-by (or waiting) power of the wireless LAN system may be effectively reduced.

Figure 12:
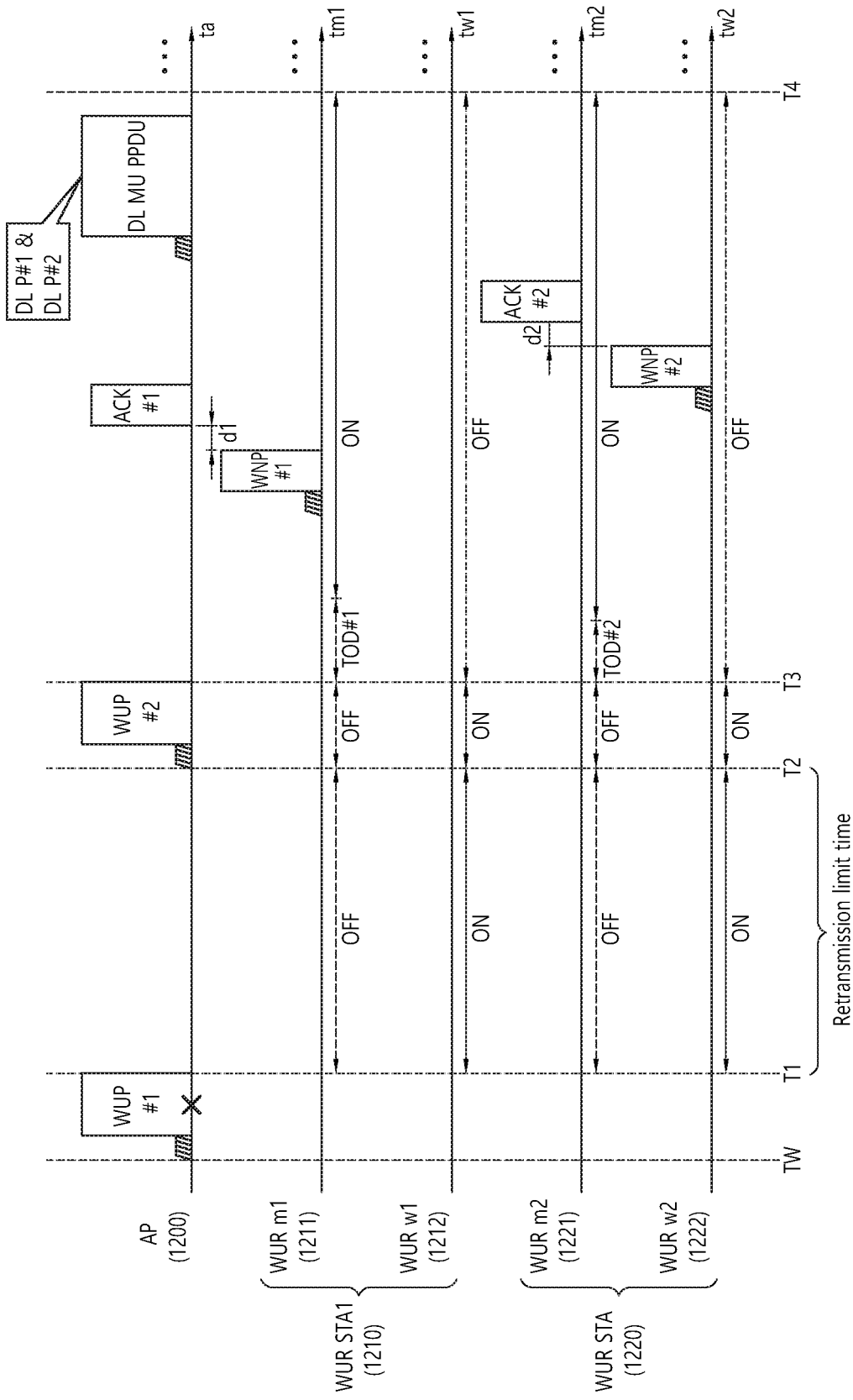
FIG. 12 is a diagram illustrating a method for power management in a wireless LAN system according to another exemplary embodiment of this specification.

FIG. 12 is a diagram illustrating a method for power management in a wireless LAN system according to another exemplary embodiment of this specification.

Referring to FIG. 10 and FIG. 12, the exemplary embodiment of FIG. 12 may adopt a Wake-up Notification Packet (hereinafter referred to as a 'WNP'), which replaces the function of the guard time of FIG. 10.

An AP (1200) of FIG. 12 may correspond to the AP (1000) of FIG. 10. A first WUR device (1210) of FIG. 12 may correspond to the first WUR device (1010) of FIG. 10. And, a second WUR device (1220) of FIG. 12 may correspond to the second WUR device (1020) of FIG. 10.

During a wake-up section (TW~T1) of FIG. 12, the AP (1200) may transmit a first wake-up packet (WUP #1). The description of the first wake-up packet (WUP #1) of FIG. 12 may be replaced with the description of the first wake-up packet (WUP #1) that is provided above in FIG. 10.

The first wake-up packet (WUP #1) of FIG. 12 may inform the first main radio module (1211) of the first WUR device (1210) and the second main radio module (1221) of the second WUR device (1220) to enter the active state based on a multicast scheme.

As another example, the first wake-up packet (WUP #1) of FIG. 12 may inform all main radio modules included in all WUR devices having received the first wake-up packet (WUP #1) to enter the active state based on a broadcast scheme.

However, due to diverse reasons (e.g., a case where the channel status of the wireless channel corresponds to a busy state), the first wake-up packet (WUP #1) of FIG. 12 may not be received by the first WUR module (1212) of the first WUR device (1210) and the second WUR module (1222) of the second WUR device (1220).

During a first section (T1~T2) of FIG. 12, the AP (1200) may not transmit a downlink packet to the WUR device (e.g., 1210 or 1220) until a response to the first wake-up packet (WUP #1) is received from the WUR device (e.g., 1210 or 1220).

The first WUR device (1210) may perform control operations so that the first main radio module (1211) can maintain the power status (i.e., OFF state) of the previous section (TW~T1). Additionally, the first WUR device (1210) may perform control operations so that the first WUR module (1212) can maintain the power status (i.e., ON state) of the previous section (TW~T1).

Similarly, the second WUR device (1220) may perform control operations so that the second main radio module (1221) can maintain the power status (i.e., OFF state) of the previous section (TW~T1). Additionally, the second WUR device (1220) may perform control operations so that the second WUR module (1222) can maintain the power status (i.e., ON state) of the previous section (TW~T1).

For example, the retransmission limit time (RLT) according to the first wake-up packet (e.g., WUP #1 of FIG. 12) may be understood as a time section (e.g., T1~T2 of FIG. 12) being counted based on a time point (e.g., T1 of FIG. 12) where the transmission of the first wake-up packet (e.g., WUP #1 of FIG. 12) by the AP (e.g., 1200 of FIG. 12) is completed.

After the elapse of the retransmission limit time (T1~T2 of FIG. 12), when a second section (T2~T3) of FIG. 12 is entered, the AP (1200) may transmit a second wake-up packet (WUP #2). After the retransmission limit time (e.g., T1~T2 of FIG. 12) is elapsed, the AP (1200) may perform control operations so that a transmission queue (not shown) of the AP (1200) can buffer the first downlink packet (DL P #1) for the first WUR device (1210) and the second downlink packet (DL P #2) for the second WUR device (1220).

The second wake-up packet (WUP #2) of FIG. 12 may include the same information according to the same method as the first wake-up packet (WUP #1). For example, the second wake-up packet (WUP #2) may inform the first main radio module (1211) of the first WUR device (1210) and the second main radio module (1221) of the second WUR device (1220) to the active state based on a multicast scheme.

As another example, the second wake-up packet (WUP #2) may inform all main radio modules included in all WUR devices having received the second wake-up packet (WUP #2) to enter the active state based on a broadcast scheme.

It may be assumed that the second wake-up packet (WUP #2) of FIG. 12 is successfully received based on the first WUR module (1212) of the first WUR device (1210) and the second WUR module (1222) of the second WUR device (1220).

At an entry point (T3) of a third section (T3~T4) of FIG. 12, the first WUR device (1210) may deliver a first wake-up signal to the first main radio module (1211). The first wake-up signal may be understood as an internal primitive information of the first WUR device (1210), which is used for the first main radio module (1211) to enter the active state (i.e., ON state).

More specifically, a time consumed for the first main radio module (1211) to enter the active state (i.e., ON state) based on the first wake-up signal may be understood as a first turn-on delay (TOD #1).

For example, in addition to the time according to the internal primitive information of the first WUR device (1210), the first turn-on delay (TOD #1) may also include a time for an association of the first WUR device (1210) with the AP (1200) based on the first main radio module (1211).

When the first turn-on delay (TOD #1) of the first main radio module (1211) is elapsed, the first main radio module (1211) may enter the active state (i.e., ON state). Subsequently, up to a time point (T4) where the third section (T3~T4) is ended, the first WUR device (1210) may perform control operations so that the first main radio module (1211) can maintain the active state (i.e., ON state).

Additionally, at a point of entry (T3) to the third section (T3~T4) of FIG. 12, the first WUR device (1210) may perform control operations so that the first WUR module (1212) can enter a turn-OFF state (i.e., OFF state). Thereafter, until an ending point (T4) of the third section (T3~T4) of FIG. 12, the first WUR device (1210) may perform control operations so that the first WUR module (1212) can maintain the turn-OFF state (i.e., OFF state).

For reference, a turn-off delay (not shown) for allowing the first WUR module (1212) to enter the turn-off state may exist. However, the turn-off delay may have a value that is relatively smaller than the first turn-on delay (TOD #1).

Similarly, at a point of entry (T3) to the third section (T3~T4) of FIG. 12, the second WUR device (1220) may deliver (or transfer) a second wake-up signal to the second main radio module (1221). The second wake-up signal may be understood as an internal primitive information of the second WUR device (1220), which is used for the second main radio module (1221) to enter the active state (i.e., ON state).

More specifically, a time consumed for the second main radio module (1221) to enter the active state (i.e., ON state) based on the second wake-up signal may be referred to as a second turn-on delay (TOD #2).

For example, in addition to the time according to the internal primitive information of the second WUR device (1220), the second turn-on delay (TOD #2) may also include a time for an association of the second WUR device (1220) with the AP (1200) based on the second main radio module (1221).

When the second turn-on delay (TOD #2) of the second main radio module (1221) is elapsed, the second main radio module (1221) may enter the active state (i.e., ON state). Subsequently, up to a time point (T4) where the third section (T3~T4) is ended, the second WUR device (1220) may perform control operations so that the second main radio module (1221) can maintain the active state (i.e., ON state).

Additionally, at a point of entry (T3) to the third section (T3~T4) of FIG. 12, the second WUR device (1220) may perform control operations so that the second WUR module (1222) can enter a turn-OFF state (i.e., OFF state). Thereafter, until an ending point (T4) of the third section (T3~T4) of FIG. 12, the second WUR device (1220) may perform control operations so that the second WUR module (1222) can maintain the turn-OFF state (i.e., OFF state).

For reference, as shown in FIG. 12, a time length for each turn-on delay (TOD #1, TOD #2), which corresponds to a time required for shifting the main radio module from the non-active state to the active state, may vary for each WUR device.

After the first main radio module (1211) enters the active state (i.e., ON state), the first WUR device (1210) may transmit a first wake-up notification packet (WNP #1) for notifying the first main radio module (1211) to enter the active state (i.e., ON state).

For example, the first wake-up notification packet (WNP #1) may be transmitted based on the first main radio module (1211). Additionally, the first wake-up notification packet (WNP #1) may be understood as a frame being transmitted based on a contention in the wireless channel.

Subsequently, the AP (1200) may transmit a first acknowledgement packet (ACK #1) as a response to the first wake-up notification packet (WNP #1). When a predetermined period of time (d1) is elapsed after the reception of the first wake-up notification packet (WNP #1), the first acknowledgement packet (ACK #1) may be transmitted. For example, the predetermined period of time (d1) may correspond to an SIFS.

After the second main radio module (1221) enters the active state (i.e., ON state), the second WUR device (1220) may transmit a second wake-up notification packet (WNP #2) for notifying the second main radio module (1221) to enter the active state (i.e., ON state).

For example, the second wake-up notification packet (WNP #2) may be transmitted based on the second main radio module (1221). Additionally, the second wake-up notification packet (WNP #2) may be understood as a frame being transmitted based on a contention in the wireless channel.

Subsequently, the AP (1200) may transmit a second acknowledgement packet (ACK #2) as a response to the second wake-up notification packet (WNP #2). When a predetermined period of time (d1) is elapsed after the reception of the second wake-up notification packet (WNP #2), the second acknowledgement packet (ACK #2) may be transmitted. For example, the predetermined period of time (d1) may correspond to an SIFS.

After the successful reception of the first acknowledgement packet (ACK #1) and the second acknowledgement packet (ACK #2), the AP (1200) may transmit a downlink multi-user PPDU (DL MU PPDU) including a first downlink packet (DL P #1) for the first WUR device (1210) and a second downlink packet (DL P #2) for the second WUR device (1220).

Figure 13:
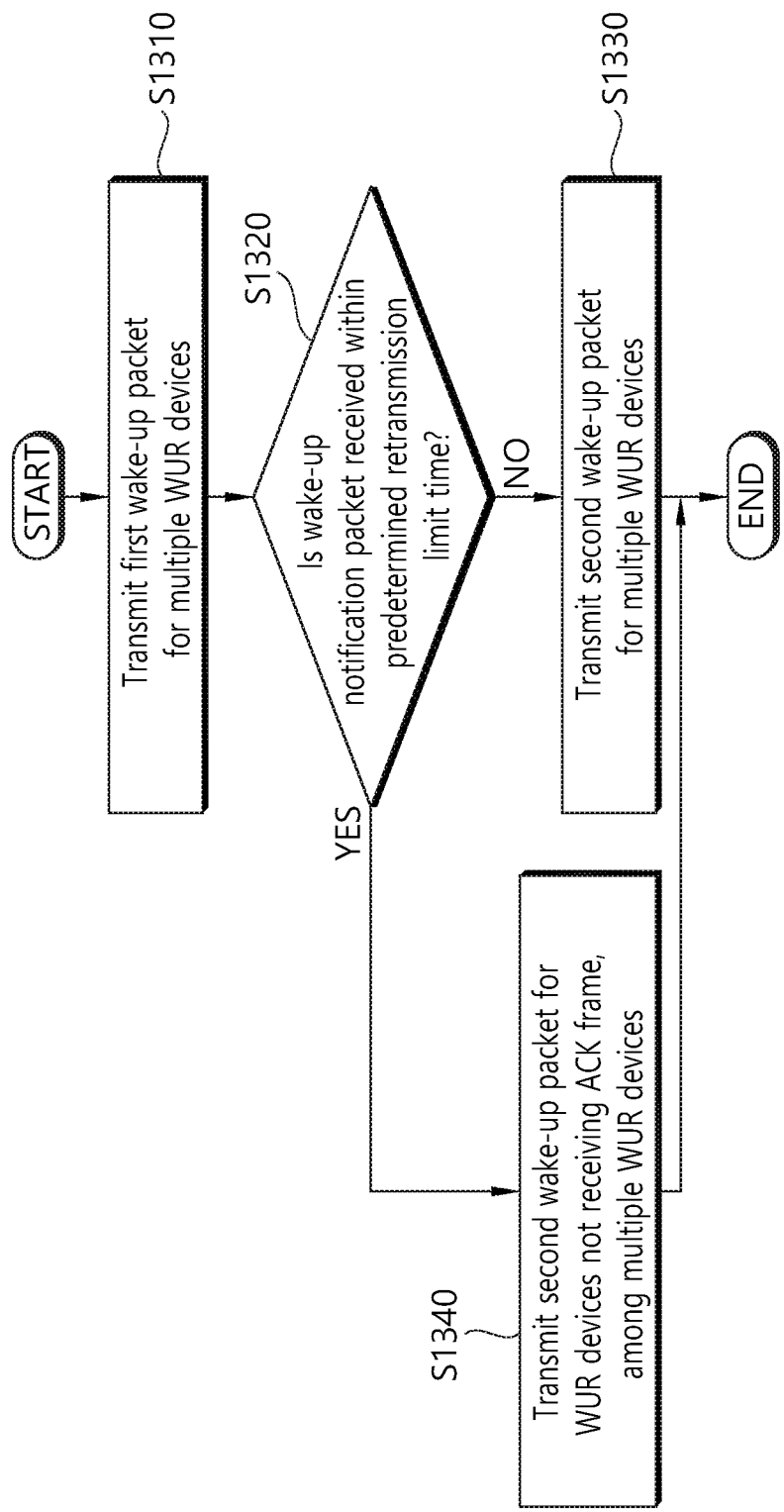
FIG. 13 is a flow chart illustrating a method for power management in a wireless LAN system according to another exemplary embodiment of this specification.

FIG. 13 is a flow chart illustrating a method for power management in a wireless LAN system according to another exemplary embodiment of this specification.

Referring to FIG. 12 and FIG. 13, in step S1310, the AP may transmit a first wake-up packet to a plurality of WUR devices. For example, the first wake-up packet (e.g., WUP #1 of FIG. 12) may be transmitted based on the multicast scheme or the broadcast scheme. The description of the first wake-up packet of FIG. 12 may be replaced with the description of the first wake-up packet that is provided above in FIG. 10.

In step S1320, the AP may determine whether or not a wake-up notification packet (WNP) is received as a response to the first wake-up packet (e.g., WUP #1 of FIG. 12) within the predetermined retransmission limit time (RLT) from at least one WUR device, among the plurality of WUR devices.

If it is determined that at least one wake-up notification packet (WNP) is received within the retransmission limit time (RLT), step S1340 may be performed. If it is determined that at least one wake-up notification packet (WNP) is not received within the retransmission limit time (RLT), step S1330 may be performed.

In step S1330, the AP may transmit a second wake-up packet for a plurality of WUR devices. For example, the second wake-up packet (e.g., WUP #2 of FIG. 12) may be transmitted based on the multicast scheme or the broadcast scheme. The second wake-up packet of step S1330 may be understood as a packet including the same information as the first wake-up packet.

In step S1340, the AP may transmit a second wake-up packet for at least one WUR device that has not received the wake-up notification packet (WNP), among the plurality of WUR devices.

Figure 14:
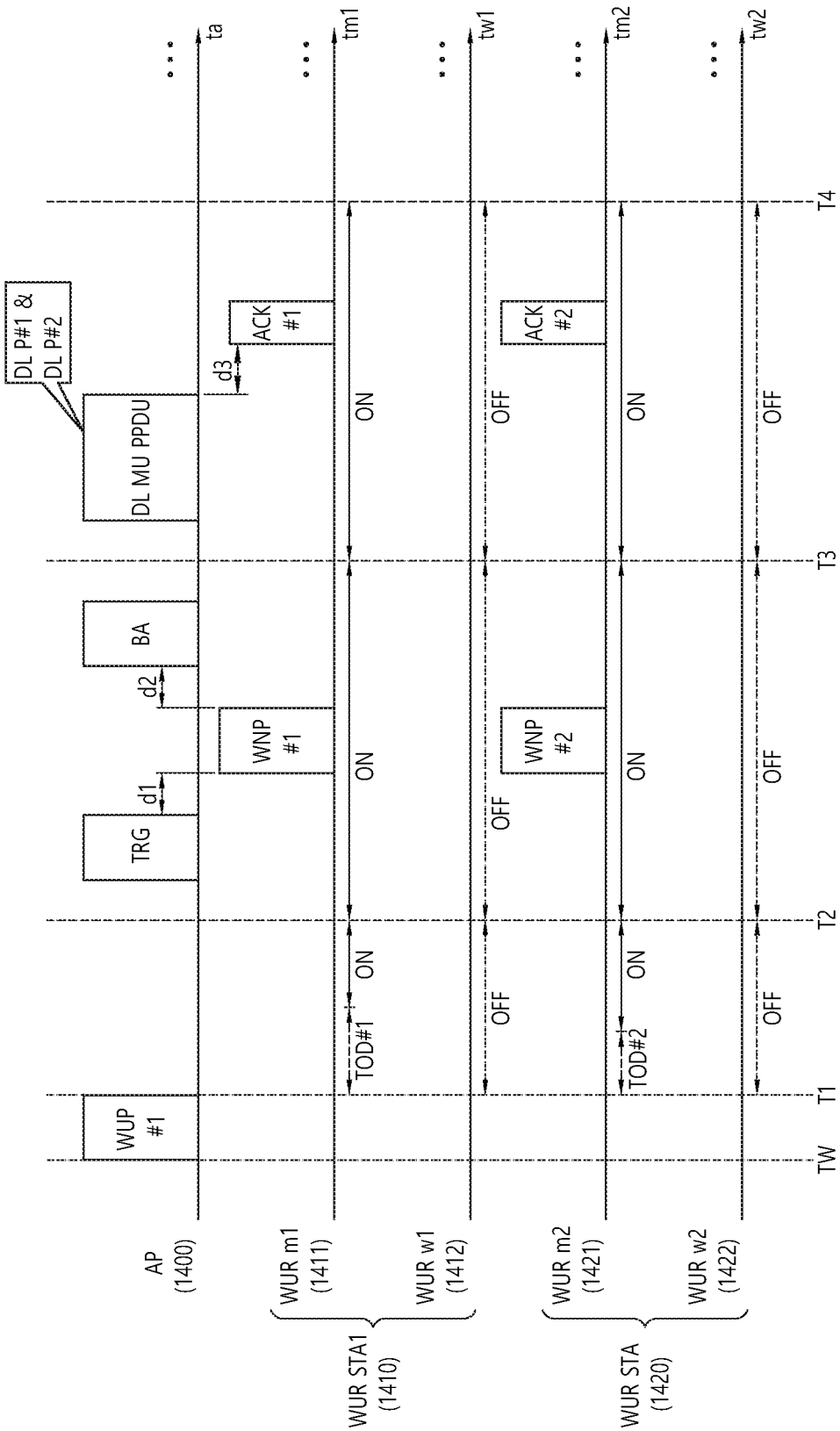
FIG. 14 is a diagram illustrating a method for power management in a wireless LAN system according to yet another exemplary embodiment of this specification.

FIG. 14 is a diagram illustrating a method for power management in a wireless LAN system according to yet another exemplary embodiment of this specification.

The yet another exemplary embodiment of this specification shown in FIG. 14 may be understood as a case where a trigger frame (TRG) for triggering the wake-up notification packet (WNP) is adopted along with the guard time of FIG. 10.

An AP (1400) of FIG. 14 may correspond to the AP (1000) of FIG. 10. A first WUR device (1410) of FIG. 14 may correspond to the first WUR device (1010) of FIG. 10. And, a second WUR device (1420) of FIG. 14 may correspond to the second WUR device (1020) of FIG. 10.

During a wake-up section (TW~T1) of FIG. 14, the AP (1400) may transmit a first wake-up packet (WUP #1). The description of the first wake-up packet (WUP #1) of FIG. 14 may be replaced with the description of the first wake-up packet (WUP #1) that is provided above in FIG. 10.

The first wake-up packet (WUP #1) of FIG. 14 may be transmitted based on the multicast scheme. In other words, the first wake-up packet (WUP #1) may inform the first main radio module (1411) of the first WUR device (1410) and the second main radio module (1421) of the second WUR device (1420) to enter the active state (i.e., ON state).

As another example, the first wake-up packet (WUP #1) of FIG. 14 may be transmitted based on the broadcast scheme. In other words, the first wake-up packet (WUP #1) may inform all main radio modules included in all WUR devices having received the first wake-up packet (WUP #1) to enter the active state (i.e., ON state).

It may be assumed that the first wake-up packet (WUP #1) of FIG. 14 is successfully received based on the first WUR module (1412) of the first WUR device (1410) and the second WUR module (1422) of the second WUR device (1420).

A guard time according to the first wake-up packet (WUP #1) may be understood as a first section (T1~T2) of FIG. 14. In this case, the first section (T1~T2) of FIG. 14 may be configured based on a parameter that is predetermined for the guard time.

At an entry point (T1) of the first section (T1~T2) of FIG. 14, the first WUR device (1410) may deliver a first wake-up signal to the first main radio module (1411). The first wake-up signal may be understood as an internal primitive information of the first WUR device (1410), which is used for the first main radio module (1411) to enter the active state (i.e., ON state).

More specifically, a time consumed for the first main radio module (1411) to enter the active state (i.e., ON state) based on the first wake-up signal may be understood as a first turn-on delay (TOD #1).

For example, in addition to the time according to the internal primitive information of the first WUR device (1410), the first turn-on delay (TOD #1) may also include a time for an association of the first WUR device (1410) with the AP (1400) based on the first main radio module (1411).

When the first turn-on delay (TOD #1) of the first main radio module (1411) is elapsed, the first main radio module (1411) may enter the active state (i.e., ON state). Subsequently, up to a time point (T2) where the first section (T1~T2) is ended, the first WUR device (1410) may perform control operations so that the first main radio module (1411) can maintain the active state (i.e., ON state).

Additionally, at a point of entry (T1) to the first section (T1~T2) of FIG. 14, the first WUR device (1410) may perform control operations so that the first WUR module (1412) can enter a turn-OFF state (i.e., OFF state). Thereafter, until an ending point (T2) of the first section (T1~T2) of FIG. 14, the first WUR device (1410) may perform control operations so that the first WUR module (1412) can maintain the turn-OFF state (i.e., OFF state).

For reference, a turn-off delay (not shown) for allowing the first WUR module (1412) to enter the turn-off state may exist. However, the turn-off delay may have a value that is relatively smaller than the first turn-on delay (TOD #1).

Similarly, at a point of entry (T1) to the first section (T1~T2) of FIG. 14, the second WUR device (1420) may deliver (or transfer) a second wake-up signal to the second main radio module (1421). The second wake-up signal may be understood as an internal primitive information of the second WUR device (1420), which is used for the second main radio module (1421) to enter the active state (i.e., ON state).

More specifically, a time consumed for the second main radio module (1421) to enter the active state (i.e., ON state) based on the second wake-up signal may be referred to as a second turn-on delay (TOD #2).

For example, the second turn-on delay (TOD #2) may include the time according to the internal primitive information of the second WUR device (1420) and a time for an association of the second WUR device (1420) with the AP (1400) based on the second main radio module (1421).

When the second turn-on delay (TOD #2) is elapsed, the second main radio module (1421) may enter the active state (i.e., ON state). Subsequently, up to a time point (T2) where the first section (T1~T2) is ended, the second WUR device (1420) may perform control operations so that the second main radio module (1421) can maintain the active state (i.e., ON state).

Additionally, at a point of entry (T1) to the first section (T1~T2) of FIG. 14, the second WUR device (1420) may perform control operations so that the second WUR module (1422) can enter a turn-OFF state (i.e., OFF state). Thereafter, until an ending point (T2) of the first section (T1~T2) of FIG. 14, the second WUR device (1420) may perform control operations so that the second WUR module (1422) can maintain the turn-OFF state (i.e., OFF state).

For reference, as shown in FIG. 14, a time length for each turn-on delay (e.g., TOD #1, TOD #2), which corresponds to a time required for shifting the main radio module from the non-active state to the active state, may vary for each WUR device.

During a second section (T2~T3) of FIG. 14, before transmitting a plurality of downlink packets for the plurality of WUR devices, the AP (1400) may transmit a trigger frame (TRG) in order to verify whether or not the plurality of main radio modules being included in each of the plurality of WUR devices are in the active state.

The trigger frame (TRG) according to yet another exemplary embodiment of this specification may correspond to a frame being transmitted based on a contention in the wireless channel. Additionally, the trigger frame (TRG) may be understood as a frame having a frame format that is disclosed in Section 9.3.1.23 of the standard document IEEE P802.11ax/D1.3, which was disclosed in June, 2017.

The trigger frame (TRG) according to the yet another exemplary embodiment of this specification may include identification information separately indicating the first and second WUR devices (1410, 1420) and a third WUR device (not shown).

The trigger frame (TRG) according to the yet another exemplary embodiment of this specification may include information on a plurality of frequency resource units being separately allocated for the first and second WUR devices (1410, 1420) and the third WUR device (not shown).

For a clearer and briefer description of FIG. 14, it may be assumed that a trigger frame (TRG) is successfully received based on the first and second main radio modules (1411, 1412) of the first and second WUR devices (1410, 1420).

Referring to FIG. 14, when a predetermined period of time (d1) is elapsed after the transmission of the trigger frame (TRG), the AP (1400) may receive a first wake-up notification packet (WNP #1), which corresponds to a response to the trigger frame (TRG), from the first WUR device (1410) according to the assumption presented above.

Simultaneously (i.e., when d1 is elapsed after the transmission of the TRG), the AP (1400) may receive a second wake-up notification packet (WNP #2), which corresponds to a response to the trigger frame (TRG), from the second WUR device (1420) according to the assumption presented above. For example, the predetermined period of time (d1) may correspond to an SIFS.

According to the assumption presented above, the AP (1400) cannot receive a third wake-up notification packet (not shown), which corresponds to a response to the trigger frame (TRG), from the third WUR device (not shown).

When a predetermined period of time (d2) is elapsed after the reception of the first wake-up notification packet (WNP #1) and the second wake-up notification packet (WNP #2), the AP (1400) may transmit a BA frame for notifying the successful reception of the first wake-up notification packet (WNP #1) and the second wake-up notification packet (WNP #2).

The BA frame that is mentioned in this specification may be understood as a frame corresponding to a Multi-STA Block Ack that is disclosed in Section 27.4.2 of the standard document IEEE P802.11ax/D1.3, which was disclosed in June, 2017.

During a third section (T3~T4) of FIG. 14, the AP (1400) may transmit the first and second downlink packets (DL P #1, DL P #2) of the first and second WUR devices (e.g., 1410, 1420), which have separately received a wake-up notification packet (WNP) during the previous section (i.e., T2~T3 of FIG. 14). In this case, the first and second downlink packets (DL P #1, DL P #2) of the first and second WUR devices (e.g., 1410, 1420) may be included in the downlink multi-user PPDU (DL MU PPDU).

Subsequently, the AP (1400) may receive a first acknowledgement packet (ACK #1) from the first WUR device (1410) as a response to the first downlink packet (DL #P1) included in the downlink multi-user PPDU (DL MU PPDU).

Simultaneously, AP (1400) may receive a second acknowledgement packet (ACK #2) from the second WUR device (1420) as a response to the second downlink packet (DL #P2) included in the downlink multi-user PPDU (DL MU PPDU).

Figure 15:
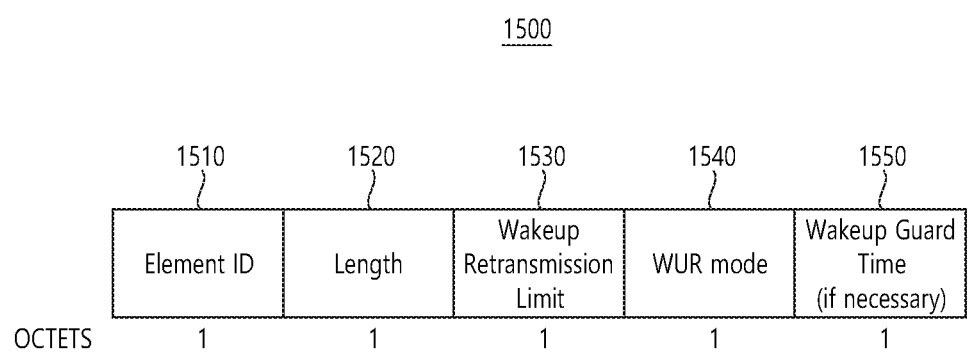
FIG. 15 is a diagram illustrating a WUR information element according to an exemplary embodiment of this specification.

FIG. 15 is a diagram illustrating a WUR information element according to an exemplary embodiment of this specification. Referring to FIG. 15, the WUR information element (1500) may include a plurality of fields (1510~1550).

An element ID field (1510) may include information for identifying the WUR information element (1500). For example, 1 octet (i.e., 8 bits) may be allocated for the element ID field (1510).

A length field (1520) may include information for indicating a length of the WUR information element (1500). For example, 1 octet (i.e., 8 bits) may be allocated for the length field (1520).

A wake-up retransmission limit field (1530) may include information on a retransmission limit time (RLT), which is mentioned in FIG. 10 and FIG. 12. A WUR mode field (1540) may include information indicating that any one of a guard time and a wake-up notification packet between the AP and the WUR device is being applied. A wake-up guard time field (1550) may include information on a guard time.

For example, the WUR information element (1500) may be included in an association request frame or an association response frame, which is exchanged for the association procedure between the AP and the WUR STA.

As another example, the WUR information element (1500) may be included in a WUR negotiation request frame or a WUR negotiation response frame, which is exchanged for a WUR negotiation procedure between the AP and the WUR STA, which is associated with the AP.

Figure 16:
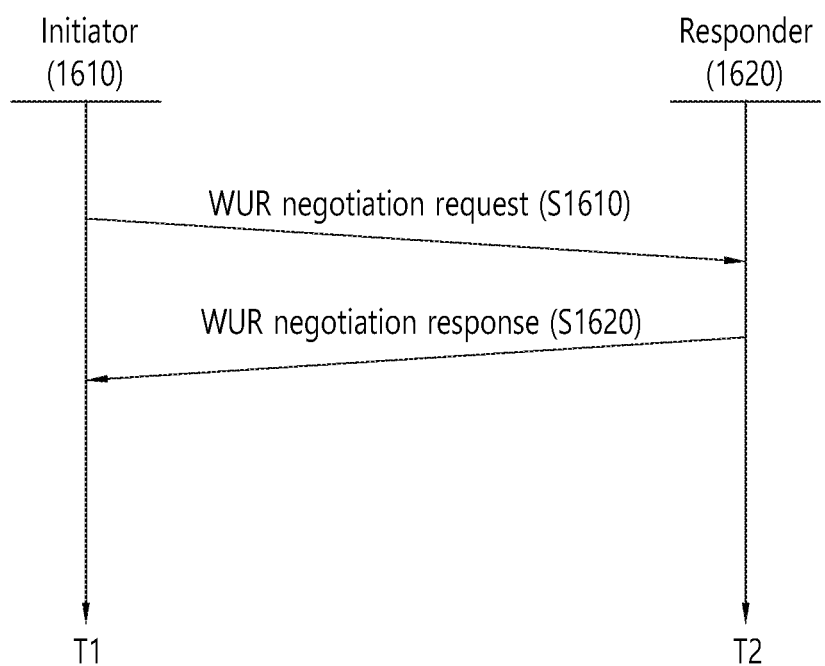
FIG. 16 is a diagram illustrating a WUR negotiation procedure according to an exemplary embodiment of this specification.

FIG. 16 is a diagram illustrating a WUR negotiation procedure according to an exemplary embodiment of this specification. Referring to FIG. 16, an indicator (1610) may be understood as a WUR device, and a responder (1620) may be understood as an AP.

In step S1610, an initiator (1610) may transmit a WUR negotiation request frame to a responder. In step 1620, the responder (1620) may transmit a WUR negotiation response frame as a response to the WUR negotiation request frame.

Referring to FIG. 15 and FIG. 16, the WUR negotiation request frame and the WUR negotiation response frame may include the WUR information element (1500).

For example, step S1610 and step S1620 may be performed during the association procedure between the AP and the WUR STA. As another example, after being performed after the association procedure between the AP and the WUR STA, a WUR negotiation procedure corresponding to step S1610 and step S1620 may be performed.

Figure 17:
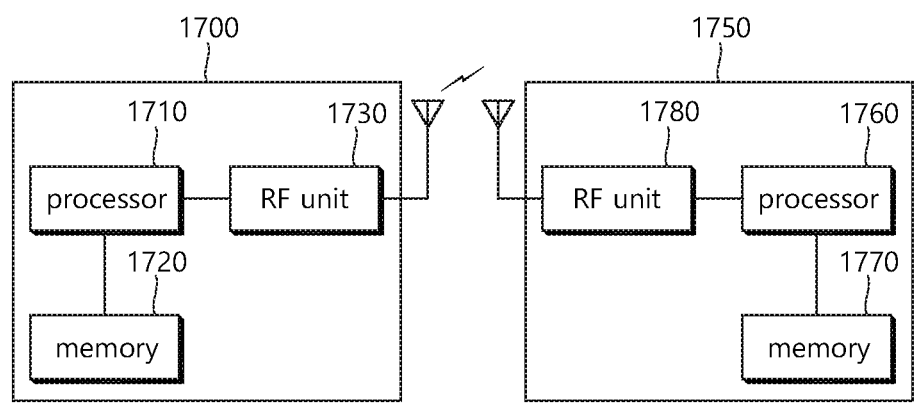
FIG. 17 is a block diagram illustrating a wireless device to which the exemplary embodiment of the present invention can be applied.

FIG. 17 is a block diagram illustrating a wireless device to which the exemplary embodiment of the present invention can be applied. Referring to FIG. 17, as an STA that can implement the above-described exemplary embodiment, the wireless device may correspond to an AP or a non-AP station (STA). The wireless device may correspond to the above-described user or may correspond to a transmitting device transmitting a signal to the user.

The AP (1700) includes a processor (1710), a memory (1720), and a radio frequency (RF) unit (1730).

The RF unit (1730) is connected to the processor (1710), thereby being capable of transmitting and/or receiving radio signals.

The processor (1710) implements the functions, processes, and/or methods proposed in the present invention. For example, the processor (1710) may be implemented to perform the operations according to the above-described exemplary embodiments of the present invention. More specifically, among the operations that are disclosed in the exemplary embodiments of FIG. 1 to FIG. 16, the processor (1710) may perform the operations that may be performed by the AP.

The non-AP STA (1750) includes a processor (1760), a memory (1770), and a radio frequency (RF) unit (1780).

The RF unit (1780) is connected to the processor (1760), thereby being capable of transmitting and/or receiving radio signals.

The processor (1760) implements the functions, processes, and/or methods proposed in the present invention. For example, the processor (1760) may be implemented to perform the operations of the non-AP STA according to the above-described exemplary embodiments of the present invention. The processor may perform the operations of the non-AP STA, which are disclosed in the exemplary embodiments of FIG. 1 to FIG. 16.

The processor (1710, 1760) may include an application-specific integrated circuit (ASIC), another chip set, a logical circuit, a data processing device, and/or a converter converting a baseband signal and a radio signal to and from one another. The memory (1720, 1770) may include a read-only memory (ROM), a random access memory (RAM), a flash memory, a memory card, a storage medium, and/or another storage device. The RF unit (1730, 1780) may include one or more antennas transmitting and/or receiving radio signals.

When the exemplary embodiment is implemented as software, the above-described method may be implemented as a module (process, function, and so on) performing the above-described functions. The module may be stored in the memory (1720, 1770) and may be executed by the processor (1710, 1760). The memory (1720, 1770) may be located inside or outside of the processor (1710, 1760) and may be connected to the processor (1710, 1760) through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method used in a wireless Local Area Network (LAN) system being performed by an access point (AP), comprising:

transmitting a first wake-up packet (WUP) for a first wake-up receiver (WUR) device including a first main radio module and a first WUR module and a second WUR device including a second main radio module and a second WUR module, wherein the first (WUP) informs the first main radio module and the second main radio module to enter an active state, wherein the first (WUP) includes a first payload being modulated based on an On-Off Keying (OOK) scheme for the first WUR module and a second payload being modulated based on the OOK scheme for the second WUR module;

based on a predetermined guard time being elapsed, transmitting a plurality of downlink (DL) packets for the first WUR device and the second WUR device;

determining whether or not at least one acknowledgement packet is received from the first WUR device and the second WUR device as a response to the plurality of DL packets within a predetermined retransmission limit time; and based on the determined result, transmitting a second WUP, wherein the retransmission limit time is configured to be longer than the guard time.

2. The method of claim 1, wherein the first WUP is transmitted by using a multicast scheme or a broadcast scheme.

3. The method of claim 1, wherein the guard time and the retransmission limit time are counted based on a time point where a transmission of the first WUP by the AP is completed.

4. The method of claim 1, wherein the first payload is embodied based on an ON signal being determined as a 1-bit ON-signal by the first WUR module and an OFF-signal being determined as a 1-bit OFF-signal by the first WUR module.

5. The method of claim 4, wherein the ON-signal is acquired by performing an Inverse Fast Fourier Transform (IFFT) for N2 number of subcarriers, among N1 number of subcarriers corresponding to a channel band of the first WUP, wherein a predetermined sequence is applied to the N2 number of subcarriers, and wherein N1 and N2 are integers.

6. The method of claim 1, wherein the transmitting the second WUP comprises:
based on determining that only a first acknowledgment packet is to be received from the first WUR device within the retransmission limit time, transmitting the second WUP to the second WUR module, wherein the second WUP informs the second main radio module of the second WUR device to enter the active state.

7. The method of claim 1, wherein the transmitting the second WUP comprises:
based on determining that at least one acknowledgment packet is not to be received within the retransmission limit time, transmitting the second WUP to the first WUR module and the second WUR module, wherein the second WUP informs the first main radio module and the second main radio module to enter the active state.

8. An access point (AP) in a wireless Local Area Network (LAN) system, comprising:
a transceiver transmitting and receiving radio signals; and
a processor being operatively connected to the transceiver,
wherein the processor is configured:
to transmit a first wake-up packet (WUP) for a first wake-up receiver (WUR) device including a first main radio module and a first WUR module and a second WUR device including a second main radio module and a second WUR module,
wherein the first WUP informs the first main radio module and the second main radio module to enter an active state,
wherein the first WUP includes a first payload being modulated based on an On-Off Keying (OOK) scheme for the first WUR module and a second payload being modulated informs the OOK scheme for the second WUR module,
based on a predetermined guard time being elapsed, to transmit a plurality of downlink (DL) packets for the first WUR device and the second WUR device,
to determine whether or not at least one acknowledgement packet is received from the first WUR device and the second WUR device as a response to the plurality of DL packets within a predetermined retransmission limit time; and
based on the determined result, to transmit a second WUP,
wherein the retransmission limit time is configured to be longer than the guard time.

9. The AP of claim 8, wherein the first WUP is transmitted by using a multicast scheme or a broadcast scheme.

* * * * *